(12) United States Patent
Rose et al.

(10) Patent No.: US 7,620,580 B1
(45) Date of Patent: Nov. 17, 2009

(54) METHOD FOR ONLINE ACCOUNT OPENING

(75) Inventors: Teresa Rose, Raleigh, NC (US);
Patricia Kinney, Cary, NC (US);
Barbara Whorf, Raleigh, NC (US);
Paal Kaperdal, Raleigh, NC (US);
Douglas Joel Zickafoose, Raleigh, NC (US)

(73) Assignee: Branch Banking & Trust Company, Raleigh, NC (US)

( * ) Notice: Subject to any disclaimer, the term of this patent is extended or adjusted under 35 U.S.C. 154(b) by 0 days.

(21) Appl. No.: 12/183,341

(22) Filed: Jul. 31, 2008

(51) Int. Cl.
*G06Q 40/00* (2006.01)
(52) U.S. Cl. .......................... 705/35; 705/30
(58) Field of Classification Search .............. 705/10–44
See application file for complete search history.

(56) References Cited

U.S. PATENT DOCUMENTS

| | | | | |
|---|---|---|---|---|
| 6,430,542 B1 * | 8/2002 | Moran | ....................... | 705/36 R |
| 7,076,458 B2 * | 7/2006 | Lawlor et al. | ................. | 705/35 |
| 7,147,147 B1 * | 12/2006 | Enright et al. | ............... | 235/379 |
| 7,330,871 B2 * | 2/2008 | Barber | ....................... | 709/201 |
| 7,567,934 B2 * | 7/2009 | Flitcroft et al. | ................ | 705/37 |
| 7,571,142 B1 * | 8/2009 | Flitcroft et al. | ................ | 705/44 |
| 2002/0103906 A1 * | 8/2002 | Knight et al. | ................ | 709/225 |
| 2002/0120537 A1 * | 8/2002 | Morea et al. | ................... | 705/35 |
| 2004/0107125 A1 * | 6/2004 | Guheen et al. | ................. | 705/7 |
| 2005/0027651 A1 * | 2/2005 | DeVault | ....................... | 705/38 |
| 2008/0126244 A1 * | 5/2008 | Loving et al. | ................. | 705/38 |

* cited by examiner

*Primary Examiner*—Frantzy Poinvil
(74) *Attorney, Agent, or Firm*—Duane Morris LLP

(57) ABSTRACT

A system and method that can be utilized to choose, set up, open, and/or manage an online account at a financial institution. The system and method allows for the automating of key aspects of an account opening process for customers such as tailoring the presentation of information to the online customer based at least in part on the customer's input, performing suitability checks for the customer based on online products chosen by the customer, presenting cross-sell products to the customer based on information known by the financial institution or currently received from the customer, and allowing a pending customer to complete the online application procedure in the absence of a confirmed identification of the online customer.

29 Claims, 20 Drawing Sheets

QUALIFICATION CRITERIA — 801

- PRODUCT REQUESTED
- CREDIT INFORMATION
- NEW OR EXISTING OFF-LINE CLIENT
- RISK RULES
- BUSINESS RULES
- PROMOTION CODE

PRIORITY CRITERIA — 802

- FINANCIAL INSTITUTION GOALS
- POTENTIAL REVENUE
- ANALYSIS OF CUSTOMER BEHAVIOR

FIGURE 8

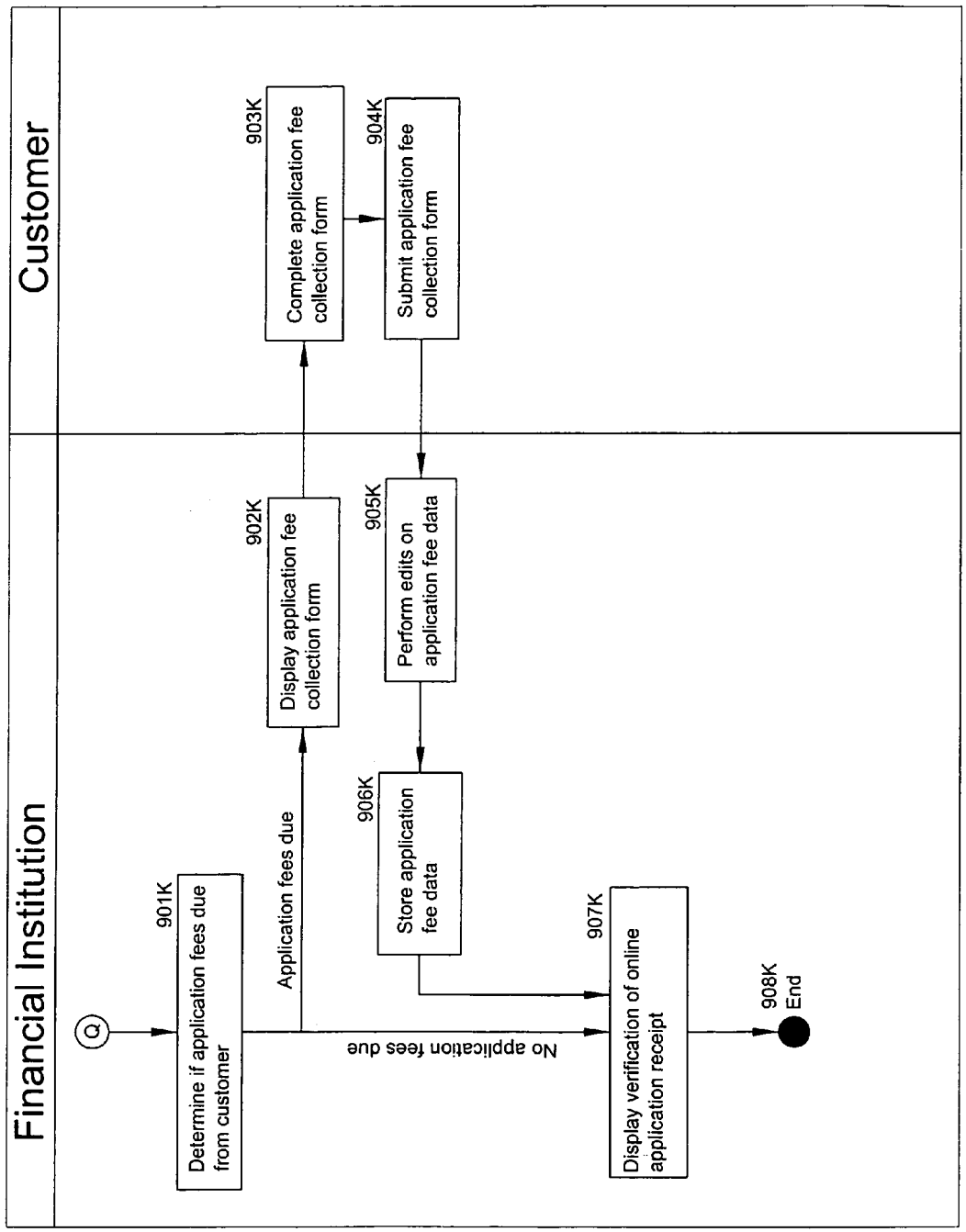

METHOD FOR ONLINE ACCOUNT OPENING

BACKGROUND

Electronic banking methods, including online accounts, have been in use for a number of years. For customers, the ease of access to account information and money management tools from virtually any location where computer connectivity is available is a very attractive and much less time consuming alternative than having to physically appear at a financial institution, such as a bank. For the financial institution that is offering online accounts to their customers, the economic benefits of online accounts are extraordinary. These benefits typically include less paper to handle, easier audit procedures, more streamlined operations, fewer employees to manage, more efficient and effective accounting through expanded use of automation, increased ability to provide interactive products to customers, etc.

While electronic banking methods have made life easier for customers once the electronic accounts are set up, the same cannot be said about the typical procedure used for opening the online (electronic) account. Typical systems in use today do not automate the online account opening process thereby creating a barrier to entry for customers who would otherwise benefit from an online account. Many existing online account opening systems require the customer to provide information to the financial institution which must then contact the potential customer later, typically via an offline communication. The customer's information must then be handled manually by an employee or temporary employee of the financial institution thereby greatly increasing the time necessary for opening an online account as well as dramatically increasing the probability for errors in processing the customer's request. Consequently, the customer resistance to the hassle, real or perceived, involved in opening an online account limits the potential benefits such accounts provide to both customers and financial institutions. Additionally, current nonautomated systems cannot take advantage of cross-sell opportunities that may present themselves if the online account opening system were automated.

The present disclosure addresses the above problems by describing methods for automating key aspects of the account opening process for customers. These methods may include, for example, ensuring that the online accounts comply with all applicable laws and regulations, establishing business processes as needed to implement and support the online account opening solution, streamlining the online account opening process for the financial institution and customers or potential customers, increasing the overall efficiency of the operation of the financial institution, etc. Some of the efficiency benefits that may be realized by automating the online account opening process may include, for example, reducing labor costs (typically for temporary personnel) incurred in support of the online account opening process, reducing the expense associated with current, nonautomated, methods for online account opening, accelerating the funding rate of accounts opened online, increasing the offer and acceptance rates of cross-sell opportunities at the time of opening the online account, obtaining quicker and more efficient access to the increasing population segment of customers who prefer to conduct business online, and engendering increased customer satisfaction by improving the customer experience for online account opening.

Accordingly, it is an object of the present disclosure to provide a method for interfacing with a financial institution using a computer interface where the method may include receiving a customer's interface request at the financial institution; sending a first content to the customer where the first content may be presented to the customer and may include a list comprising one or more products; receiving at the financial institution a first input from the customer which may be based on the first content and may include a choice of one or more of the offered products; determining if the customer is a current online client of the financial institution; if the customer is a current online client, receiving from the customer a first set of information which may be verified by the financial institution (or by a third party which is not part of the financial institution) and sending a second content to the customer; if the customer is not a current online client or if the first set of information is not verified by the financial institution (or third party), requesting a second set of information from the customer and determining a status of the customer (either internally by the financial institution or externally by a third party), by (i) receiving at the financial institution the second set of information from the customer; (ii) determining if the customer is an offline client of the financial institution which may be based on the second set of information and if the customer is an offline client, sending the second content to the customer; and (iii) determining an identification of the customer if the second information has been received and the customer has been determined to be an offline client, or flagging the customer as a pending customer if an identification of the customer cannot be determined; performing a suitability check on the customer or pending customer which may be based on the first input; approving the customer or pending customer for the chosen product which may be based on the suitability check or flagging the customer as a pending customer if not approved for the chosen product (which may be based on the suitability check); and sending a third content to the customer or pending customer which may be based on a set of qualification criteria where the third content may include a list comprising one or more cross-sell products.

Additionally, the above method may further include receiving at the financial institution a second input from the customer or pending customer which may be based on the third content and may include a choice of one or more cross-sell products; sending a fourth content to the customer or pending customer; and sending a fifth content to the customer or pending customer.

Still further, the above method may include setting up an account for the customer if the customer has been approved for the chosen product; and informing the customer of the account set up.

The above advantages, as well as many other advantages, of the present disclosure will be readily apparent to one skilled in the art to which the disclosure pertains from a perusal of the claims, the appended drawings, and the following detailed description.

BRIEF DESCRIPTION OF THE DRAWINGS

FIG. 8 lists some of the qualification criteria and priority criteria that may be used for a method of online account opening according to an embodiment of the disclosure.

FIGS. 9A through 9K represent a detailed flow diagram for a method of online account opening according to an embodiment of the disclosure.

DETAILED DESCRIPTION

Figure 1A:
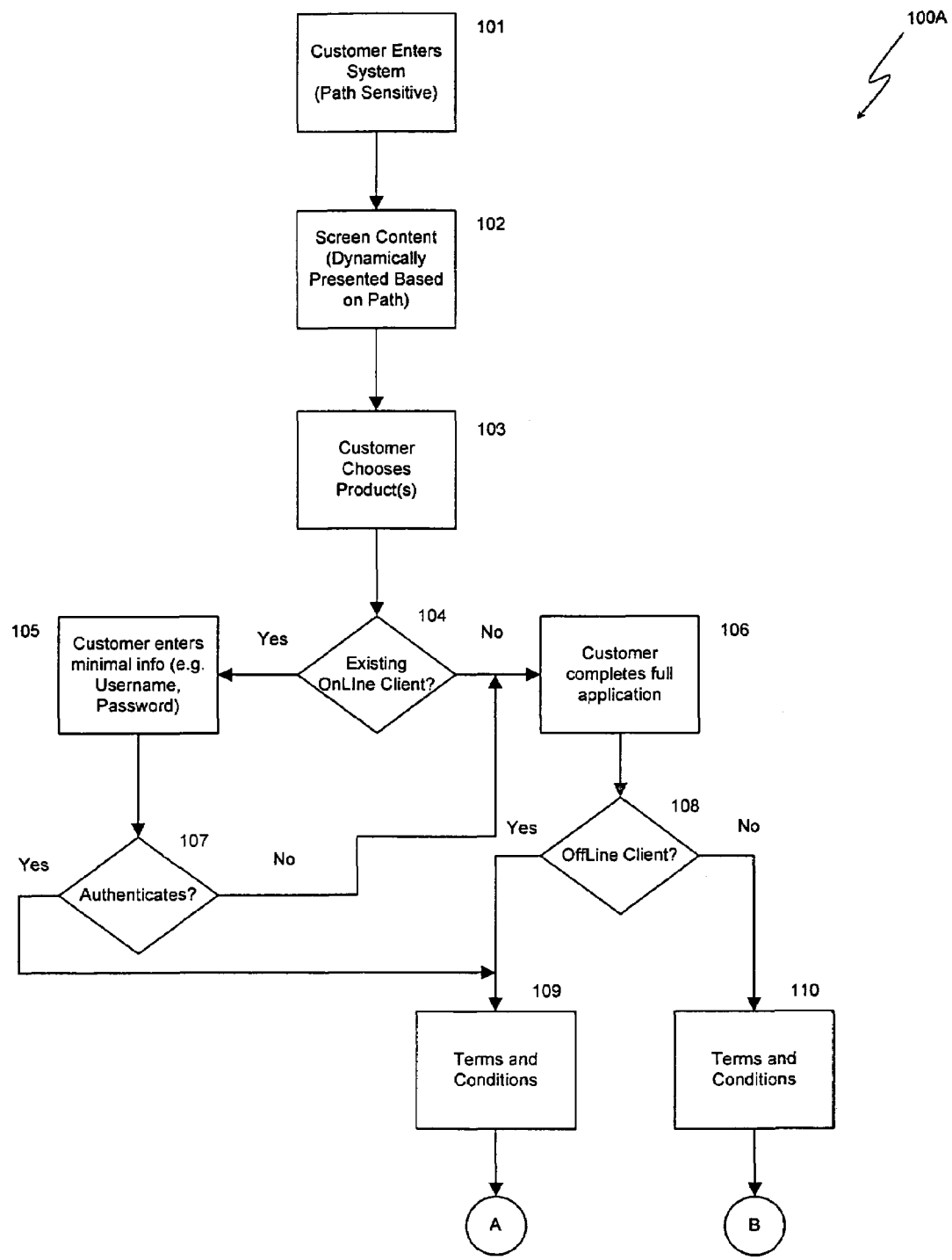
FIGS. 1A and 1B are a flow diagram for a method of online account opening according to an embodiment of the disclosure.

The present disclosure may be utilized to choose, set up, open, and/or manage (individually or collectively, "account interfacing") an online account at a financial institution. "Online" may mean connecting to or accessing account information from a location remote from the financial institution or a branch of the financial institution. Alternatively, "online" may refer to connecting to or accessing an electronic network (wired or wireless) via a computer over a network such as a local area network, wide area network, internet, or other similar network system. The connection may be to a website (which may contain one or more webpages, as is known in the art) provided on the network by the financial institution. A financial institution may be, but is not limited to, a bank or other similar entity. "Website" and "webpage" may be used interchangeably herein.

The present disclosure may be used to provide a potential online customer with access to a webpage which may include a matrix of information about products from which the customer can choose one or more. The information thus provided to the customer may allow the customer to differentiate between the products offered thereby allowing the customer to make an informed choice as to which product(s) is best for them. The initial information presented may be tailored to only include essential information for the selection process, such as, but not limited to, fees, eligibility requirements, features, and interest rates, where appropriate. Additionally, the customer may choose to view further, more detailed, information about the offered products and can do so by requesting such information (e.g., following an online link from the financial institution's webpage). Furthermore, the website may include tools and information to assist the customer to compare two or more of the products offered; the webpage may also include an e-mail address, network link, live "chat" connection (as is known in the art), or telephone number to customer service; and the webpage may further include a list of frequently asked questions with appropriate answers.

In order to assist the customer further during the online account interface session, the financial institution's website may include one or more of the following features: estimated time for completion of the online application; an alert indicating materials that the customer may need to complete the online application; a secure connection to protect the customer's personal information; a progress indicator showing, for example, the customer's progress through the account opening process; an explanation as to why certain information is needed from the customer; information regarding the handling of the account information once it is electronically submitted by the customer to the financial institution; and an indication of when and how the customer will be notified of approval or disapproval for the selected product. Additionally, the following features may also be utilized: pre-filling information in fields that can be pre-filled (e.g., the website may automatically enter the customer's address once the customer has been properly identified, etc.); presentation of clear error messages on the online form being filled in by the customer along with possible causes for the error message; pre-submittal and post-submittal verification screens for the customer to review and edit; provision for links to other accounts/products the customer had previously set up with the financial institution; prompts for account add-ons; prompts for cross-sell products; and allowance for partially completing an application for later retrieval and completion by the customer.

Figure 1B:
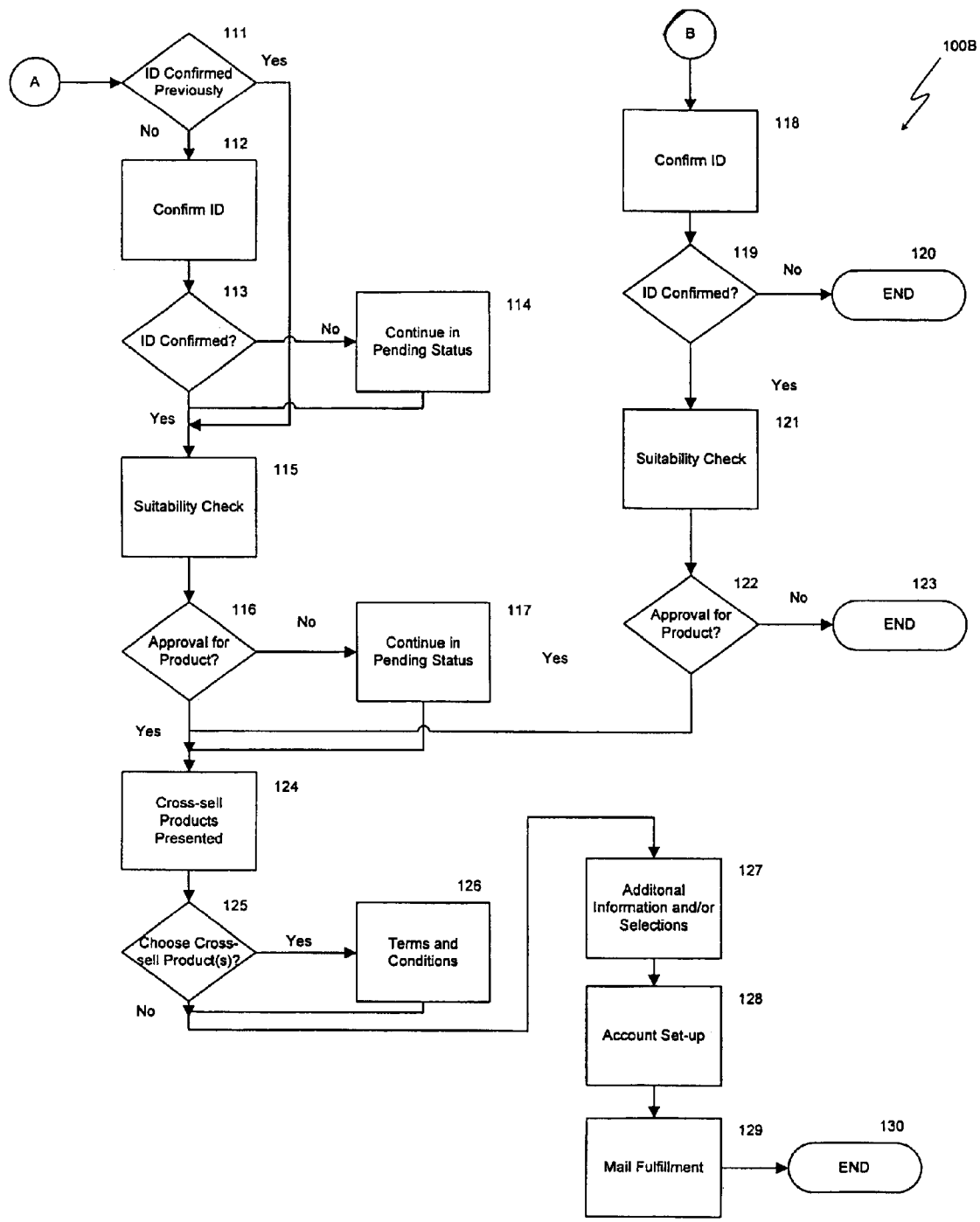

With attention now drawn to FIGS. 1A and 1B, a flow diagram, 100A and 100B, respectively, for a method of online account opening according to an embodiment of the disclosure is presented. In FIG. 1A, at block 101 a customer or potential customer may enter the financial institution's electronic system for opening an account online. As described above, this may be a website provided by the financial institution that the customer can access via a public or private network. The customer may enter the website a number of ways (i.e., the customer's entrance into the financial institution's website may be "path sensitive", which may have implications as discussed further below) such as via a public network, via a link from another account the customer may have with the financial institution, via an e-mail advertisement sent to the customer by the financial institution, in response to receipt of a promotional advertisement, etc. This may sometimes be referred to herein as an interface request. At block 102 screen content may be presented to the customer by the financial institution. This may sometimes be referred to herein as first content. This screen content may be dynamically presented based on the path the customer used to get to the financial institution's website. The screen content may include a list of products offered by the financial institution to the customer. The list of products may be different depending on the path the customer used to get to the financial institution's website. For example, if the customer is an existing online customer of the financial institution and already has Product A, then the list of products presented at block 102 may not include Product A since the customer already has Product A. At block 103 the customer may choose one (or more) of the products presented in block 102. This may sometimes be referred to herein as first input. The products presented at block 102 may include, but are not necessarily limited to the following: credit card, checking account, savings account, loan, insurance, investment, cash management, check card, etc. as are known in the art.

At block 104, a determination may be made as to whether the customer is an existing online client of the financial institution. This determination may be based on information from block 101 or other information provided by the customer or from another source, including records possessed by the financial institution. If the customer is an existing online client of the financial institution, then at block 105 the customer enters information (which may sometimes be referred to herein as first information) such as, for example, a username and password. This information may typically be entered using a computer. Alternatively, as would be understood by those of skill in the art, other information may be used in place of a username and password. In a particular preferred embodiment, since the customer is an existing online client of the financial institution only a limited amount of information need be entered by the customer. At block 107, the information provided by the customer at block 105 may be authenticated by any appropriate method known in the art. If the information entered by the customer at block 105 is authenticated, then the financial institution may, at block 109, present to the customer (e.g., by displaying information on a webpage presented to the customer) terms and conditions (which may sometimes be referred to herein as second content) as will be discussed in further detail below.

Returning attention back to block 104, if the customer is determined to not be an existing online client of the financial institution, then at block 106 the customer enters information (which may sometimes be referred to herein as second information), for example, using a computer. Alternatively, if at block 107 the customer's information is not or cannot be authenticated, then at block 106 the customer enters information (which may sometimes be referred to herein as second information), for example, using a computer as discussed above. The information entered at block 106 typically is more extensive and/or detailed than the information which is typically entered at block 105 (since at block 106 the determination has been made that the customer is not an online client of the financial institution or the customer's information entered at block 105 cannot be authenticated). The information entered at block 106 may be a "full application" including, but not necessarily limited to, information such as the customer's name, address, telephone number, e-mail address, etc. At block 108, a determination may be made as to whether the customer is an offline client of the financial institution. An offline client may include the situation where the customer currently does business with the financial institution but not through the financial institution's online system. This determination may be made based at least partially on the information entered by the customer at block 106 and/or block 101. If the determination is made that the customer is an offline client of the financial institution, then the financial institution may, at block 109, present to the customer (e.g., by displaying information on a webpage presented to the customer) terms and conditions (which may sometimes be referred to herein as second content) as will be discussed in further detail below. If the determination made at block 108 is that the customer is not an offline client of the financial institution, then the financial institution may, at block 110, present to the customer (e.g., by displaying information on a webpage presented to the customer) terms and conditions (which may sometimes be referred to herein as second content) as will be discussed in further detail below.

The terms and conditions presented to the customer at block 109 or block 110 may be dynamically presented based at least partially on the choice of product made by the customer at block 103. In another embodiment, the specific terms and conditions presented to the customer may also be based on whether or not the customer is an online client of the financial institution and/or whether or not the customer is an offline client of the financial institution. In a further embodiment, for a particular product chosen at block 103 by the customer, the terms and conditions that may be presented at block 109 may be different than the terms and conditions that may be presented at block 110 based on, for example, the customer's status with respect to the financial institution (e.g., online client, offline client, both, neither). The terms and conditions, as is known in the art, typically includes information appropriate for the product chosen by the customer at block 103 and may include information, such as, but not limited to, minimum balance requirements, payment rules, interest rates charged, late fee applicability, etc.

Continuing now from block 109 as it carries over from FIG. 1A to FIG. 1B via connecting block A, at block 111 a determination may be made as to whether an identification of the customer has been verified and/or authenticated, such as at blocks 105 and 107 as discussed above. If the customer's identification has been verified and/or authenticated, then a suitability check may be performed at block 115, as discussed in further detail below. If at block 111 an identification of the customer has not been previously verified and/or authenticated, then at block 112 an identification of the customer is confirmed (i.e., verified and/or authenticated). The procedure for confirmation of the customer at block 112 may be similar to the procedure for authentication of the customer at block 107. Proceeding now to block 113, if the customer's identification is confirmed at block 113, then at block 115 a suitability check may be performed as discussed in further detail below. If at block 113 the customer's identification cannot be confirmed, then at block 114 the customer may be flagged as a pending customer and proceed with a pending customer status. In this way, the customer is not kicked out of the system for what may be nothing more than a minor error thereby affording the customer a more pleasant online experience with the financial institution. After the customer is flagged as a pending customer at block 114, then a suitability check may be performed at block 115, as discussed in further detail below.

The pending application may be reviewed offline by authorized personnel (e.g., an employee and/or agent of the financial institution) who may then correct and thereafter release the application from pending status. This will preferably happen without further intervention by the customer/pending customer. In the event that the pending application cannot be cleared by the authorized personnel, the financial institution may initiate direct contact with the customer/pending customer in order to be able to release the application from pending status.

At block 115, a suitability check may be performed on the customer or pending customer. The suitability check may be based on information obtained from sources either internal or external to the financial institution and may also be based on information provided by the customer/pending customer (e.g., at block 101 and/or at blocks 105 or 106) and the product chosen by the customer/pending customer in block 103. The information for the suitability check may include one or more of the following types of information, as is known in the art: credit check information, debit check information, fraud database information, identity verification information, account abuse information, financial history information, or combinations of one or more of the foregoing.

At block 116, a determination may be made regarding whether to approve the customer/pending customer for the chosen product based at least in part on the suitability check at block 115. If the customer/pending customer is not approved for the chosen product, then the customer/pending customer may continue with the process in a pending status at block 117 and continue to block 124. If the customer/pending customer is approved for the chosen product, then the customer/pending customer may be presented with cross-sell products at block 124 as discussed in further detail below.

With reference now directed to FIG. 1A and continuing from block 110 as it carries over from FIG. 1A to FIG. 1B via connecting block B, at block 118 at block 118 an identification of the customer is confirmed (i.e., verified and/or authenticated). The procedure for confirmation of the customer at block 118 may be similar to the procedure for authentication of the customer at block 112. Proceeding now to block 119, if the customer's identification is confirmed at block 119, then at block 121 a suitability check may be performed as discussed above with reference to block 115. If at block 119 the customer's identification cannot be confirmed, then the procedure is ended at block 120.

At block 122, a determination may be made regarding whether to approve the customer for the chosen product based at least in part on the suitability check at block 121. If the customer is not approved for the chosen product, then the procedure is ended at block 123. If the customer is approved for the chosen product, then the customer may be presented with cross-sell products at block 124 as discussed in further detail below.

At block 124, the financial institution may present the customer/pending customer with a list of cross-sell products (which may sometimes be referred to herein as third content) from which the customer/pending may choose one or more. The list of cross-sell products provided to the customer/pending customer may be based on a number of factors including, but not limited to, information provided by the customer/pending customer (e.g., at block 101 and/or at block 105/106), whether the customer/pending customer is approved by the financial institution (e.g., at block 107 and/or block 112/118 as appropriate), the product chosen by the customer/pending customer (e.g., at block 103), other products that the client may have (e.g., from the financial institution's records if the customer/pending customer is an existing online or offline client of the financial institution), a credit check, and the financial institution's qualification criteria. The qualification criteria may include, but is not necessarily limited to, the following: the customer/pending customer's choice of one or more products, the suitability check, a predetermined set of risk rules, a predetermined set of business rules, a predetermined promotional code, information received from the customer/pending customer, existing customer/pending customer accounts at said financial institution, and existing customer/pending customer products at said financial institution. The predetermined set of risk rules may include a factor based on a current line of credit request from the customer/pending customer. The predetermined set of business rules may include a factor based on an estimate of potential revenue for the financial institution for the customer's choice of a product. The predetermined set of business rules may further include a factor based on an analysis of a financial behavior, as is known in the art, of the customer or pending customer.

At block 125, the customer/pending customer may choose one or more of the cross-sell products presented by the financial institution at block 124 (which may sometimes be referred to herein as second input). If the customer/pending customer chooses a cross-sell product, then at block 126 the financial institution may present to the customer (e.g., by displaying information on a webpage presented to the customer) terms and conditions (which may sometimes be referred to herein as fourth content) as discussed above with respect to block 109 and/or block 110. In an embodiment, the terms and conditions presented at block 126 may be dynamically presented, as discussed above, and may be based at least on one or more of the following: information provided by the customer/pending customer (e.g., information provided at one or more of blocks 101, 105, and 106), the customer/pending customer's choice of product at block 103, and the customer/pending customer's choice of cross-sell product at block 125.

At block 127 the financial institution may present to the customer/pending customer additional information and/or selections (which may sometimes be referred to herein as fifth content) such as, but not limited to, finding requirements, check card information, online banking information, etc. In an embodiment, the presentation of this additional information and/or selections at block 127 may be dynamically presented and may be based at least on one or more of the following: information provided by the customer/pending customer (e.g., information provided at one or more of blocks 101, 105, and 106), the customer/pending customer's choice of product at block 103, the customer/pending customer's choice of cross-sell product at block 125, and information from the financial institution's records if the customer/pending customer is an existing online or offline client of the financial institution.

At block 128, the financial institution may initiate account set-up, as is known in the art, for the products and/or cross-sell products chosen by the customer/pending customer. At block 129, the financial institution may mail a fulfillment, as is known in the art, to the customer/pending customer. The fulfillment may reach the customer/pending customer by postal service, e-mail, mobile phone message (voice or text), via a web page, or other methods known in the art. Typically, the fulfillment, which may include a confirmation of the overall transaction represented by 100A and 100B, will be delivered to the customer via the postal service, but the application is not so limited. As would be obvious to those of skill in the art, any method of delivery of the fulfillment to the customer/pending customer is contemplated by the present disclosure. In an embodiment, the fulfillment is dynamic and may be based on at least one or more of the following: the customer/pending customer's choice of product at block 103, and the customer/pending customer's choice of cross-sell product at block 125. In certain embodiments, physical things such as credit cards may be sent to the customer/pending customer.

Regarding the fulfillment, the purpose of contacting the customer may include confirming to the customer that the customer's chosen products are ready for use and to provide to the customer information and means to begin using the account, such as checks, a check card, account numbers, credit cards, etc., where applicable to the product chosen. Additionally, the fulfillment provides the customer with information concerning how to begin using any special features of the product chosen, such as, but not limited to, how to get started with online tools to manage the product account, using online tools to pay bills, signing-up for and using mobile banding and electronic statements, and information on how to use multiple channels (phone, branch, online) for future banking needs or questions. Furthermore, the fulfillment may include copies of terms and conditions for use of the product chosen, a privacy notice. At block 130, the procedure ends.

Figure 2:
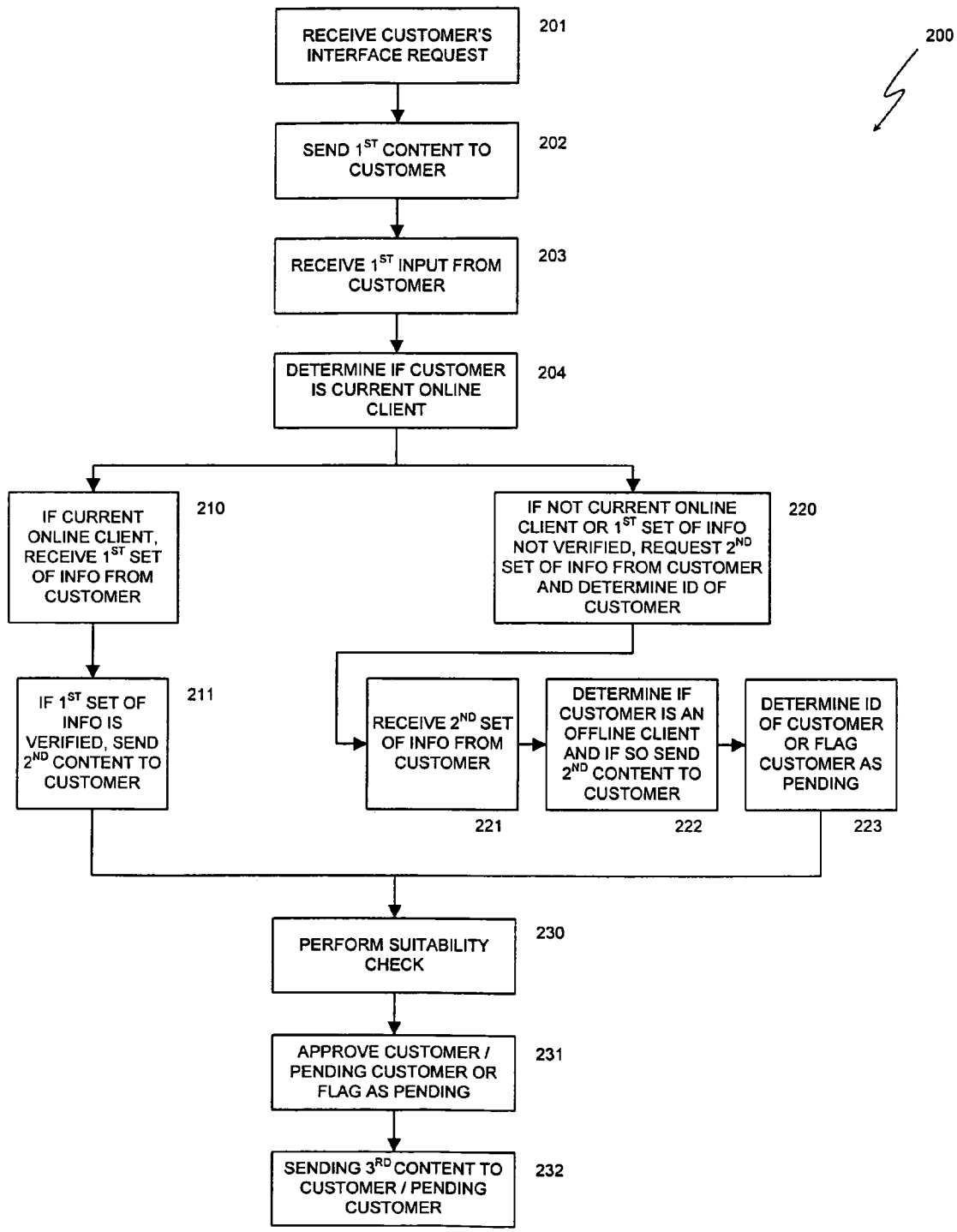
FIG. 2 is a flow diagram for a method of online account opening according to an embodiment of the disclosure.

With reference now directed towards FIG. 2, a flow diagram 200 for a method of online account opening according to an embodiment of the disclosure is presented. At block 201 a customer or potential customer may enter the financial institution's electronic system for opening an account online, as described above with respect to block 101 in FIG. 1A. At block 202 screen content (first content) may be presented to the customer by the financial institution as discussed above with respect to block 102 in FIG. 1A. At block 203 the customer may choose one (or more) of the products presented in block 202 (first input), as discussed above with respect to block 103 in FIG. 1A.

At block 204, a determination may be made as to whether the customer is an existing online client of the financial institution as discussed above with respect to block 104 in FIG. 1A. At block 210, if the customer is an existing online client of the financial institution, then the customer enters information (first information or first set of information) such as, for example, a username and password as discussed above with respect to block 105 in FIG. 1A. At block 211, the information provided by the customer at block 210 may be verified/authenticated by any appropriate method known in the art (as discussed above with respect to block 107 of FIG. 1A) and the financial institution may present to the customer (e.g., by displaying information on a webpage presented to the customer) terms and conditions (second content) as discussed above with respect to block 109 of FIG. 1A.

At block 220, if the customer is determined to not be an existing online client of the financial institution or if the customer's information as discussed above at block 210 is not or cannot be authenticated/verified, then a second set of information (second information) from the customer may be requested by the financial institution, as discussed above with respect to block 106 in FIG. 1A. Additionally at block 220 an identification of the customer may be determined. At block 221, the second set of information may be received from the customer. At block 222 a determination may be made as to whether the customer is an offline client of the financial institution (as discussed above with respect to block 108 in FIG. 1A) and if the customer is determined to be an offline client of the financial institution, then terms and conditions may be sent to the customer as discussed above with respect to block 109 in FIG. 1A. At block 223 an identification of the customer may be determined as discussed above with respect to blocks 111, 112 and 113 in FIG. 1B. If the customer's identity cannot be determined, then the customer may be flagged as a pending customer as discussed above with respect to block 114 in FIG. 1B.

With reference now to block 230, a suitability check may be performed as discussed above with respect to block 115 in FIG. 1B. At block 231, the customer/pending customer may be approved for the product chosen in block 203 above or if the customer/pending customer is not approved for the chosen product, then the customer/pending customer may continue with the process in a pending status. At block 232, the financial institution may present to the customer/pending customer a list of cross-sell products as discussed above with respect to block 124 in FIG. 1B.

Figure 3:
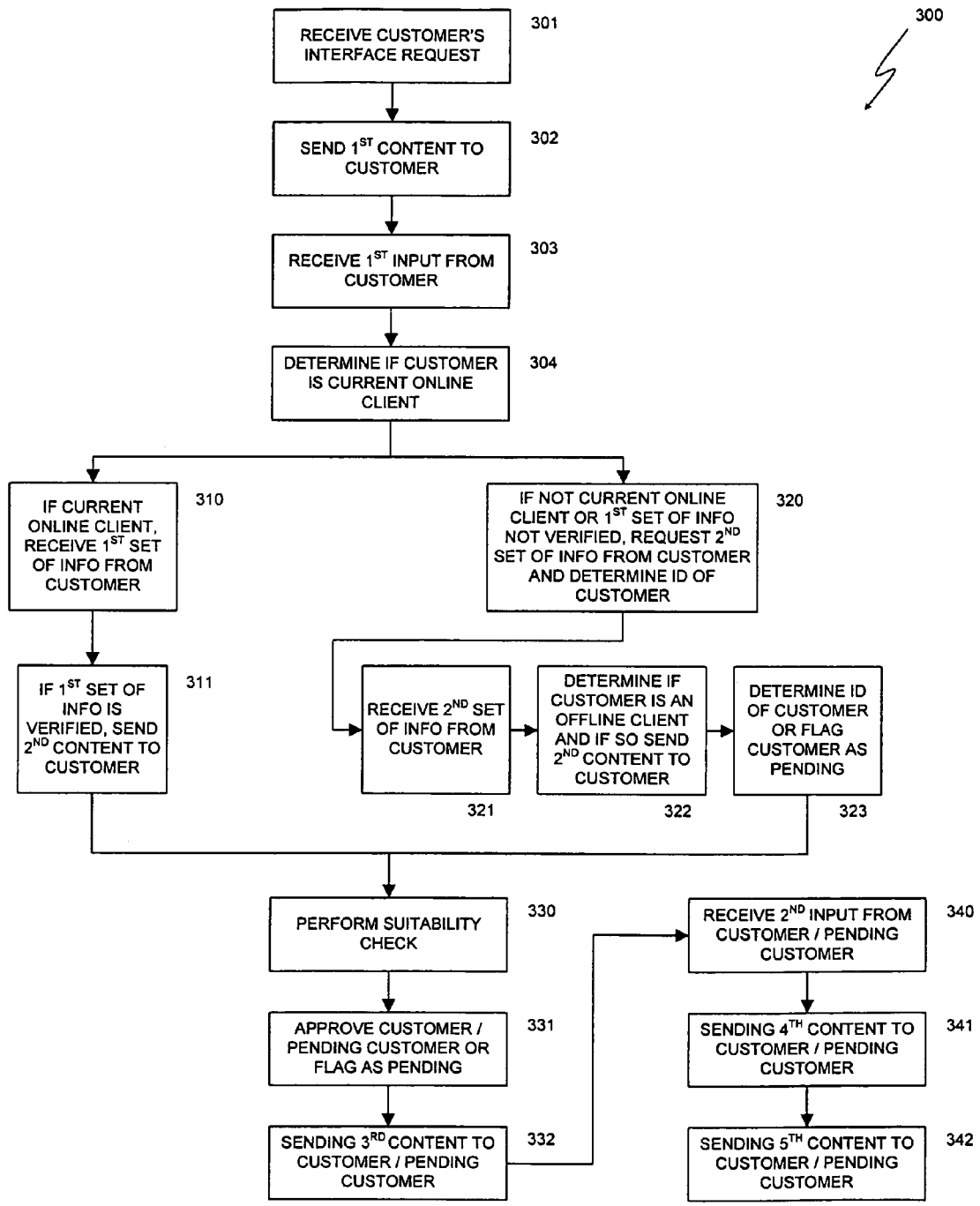
FIG. 3 is a flow diagram for a further method of online account opening according to an embodiment of the disclosure.

With reference now directed to FIG. 3, a flow diagram 300 for a further method of online account opening according to an embodiment of the disclosure is presented. As between FIGS. 2 and 3, like reference numbers relate to like components and/or procedural steps. Accordingly, blocks 301, 302, 303, 304, 310, 311, 320, 321, 322, 323, 330, 331, and 332 are similar to blocks 201, 202, 203, 204, 210, 211, 220, 221, 222, 223, 230, 231, and 232 in FIG. 2 and the descriptions of those blocks will not be repeated.

At block 340, the customer may choose one or more of the cross-sell products presented by the financial institution at block 332 and inform the financial institution of that choice (second input). If the customer/pending customer chooses a cross-sell product, then at block 341 the financial institution may present to the customer (e.g., by displaying information on a webpage presented to the customer) terms and conditions (fourth content) as discussed above with respect to block 126 in FIG. 1B. At block 342 the financial institution may present to the customer/pending customer additional information and/or selections (fifth content) as discussed with respect to block 127 in FIG. 1B.

Figure 4:
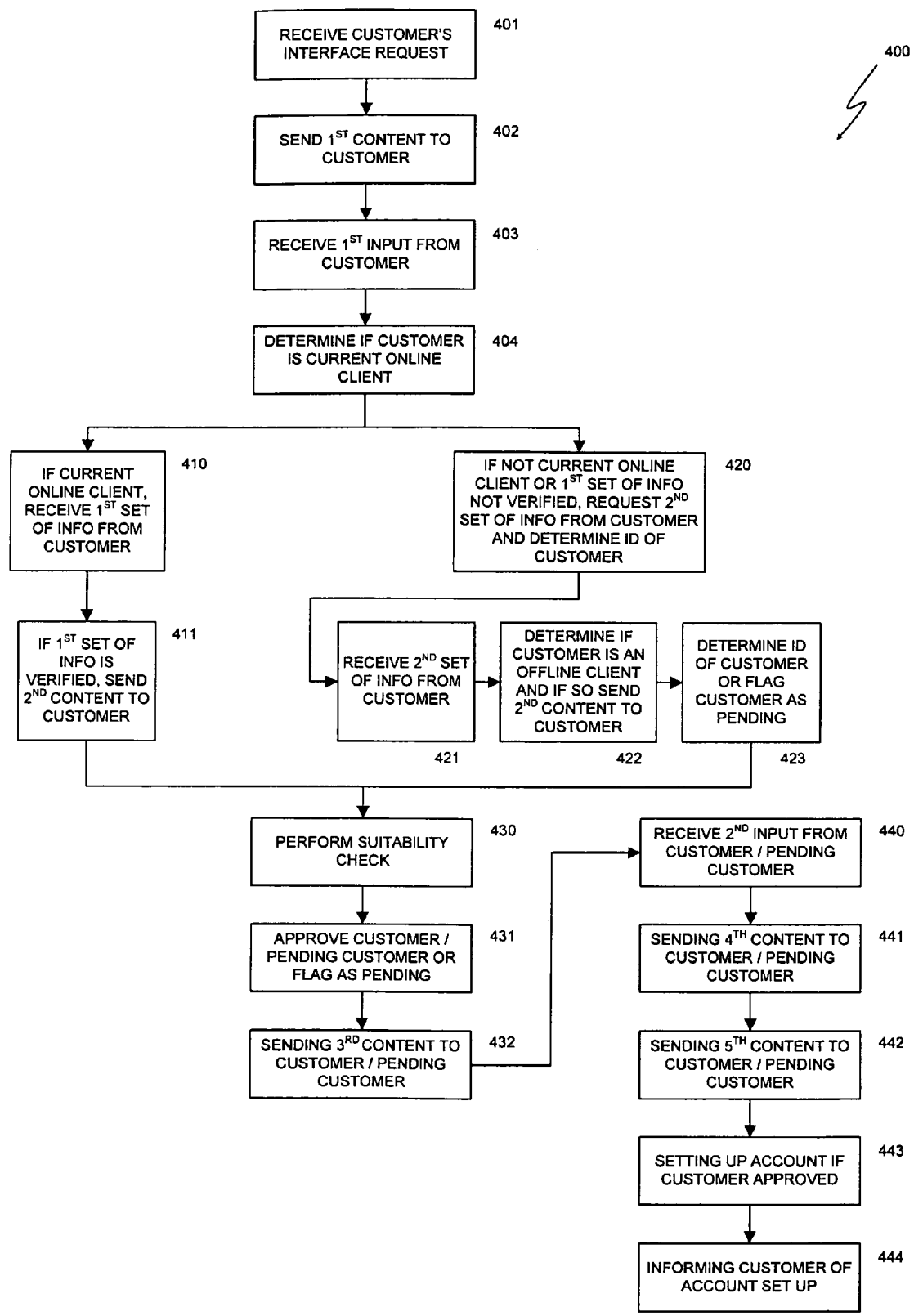
FIG. 4 is a flow diagram for a method of online account opening including informing the customer of the account set up according to an embodiment of the disclosure.

With reference now directed to FIG. 4, a flow diagram 400 for a further method of online account opening including informing the customer of the account set up according to an embodiment of the disclosure is presented. As between FIGS. 4 and 3, like reference numbers relate to like components and/or procedural steps. Accordingly, blocks 401, 402, 403, 404, 410, 411, 420, 421, 422, 423, 430, 431, 432, 440, 441, and 442 are similar to blocks 301, 302, 303, 304, 310, 311, 320, 321, 322, 323, 330, 331, 332, 340, 341, and 342 in FIG. 3 and the descriptions of those blocks will not be repeated.

At block 443, the financial institution may initiate account set-up, as is known in the art, for the products and/or cross-sell products chosen by the customer/pending customer as discussed above with respect to block 128 in FIG. 1B. At block 444, the financial institution may mail a fulfillment, as is known in the art, to the customer/pending customer as discussed above with respect to block 129 in FIG. 1B.

Figure 5:
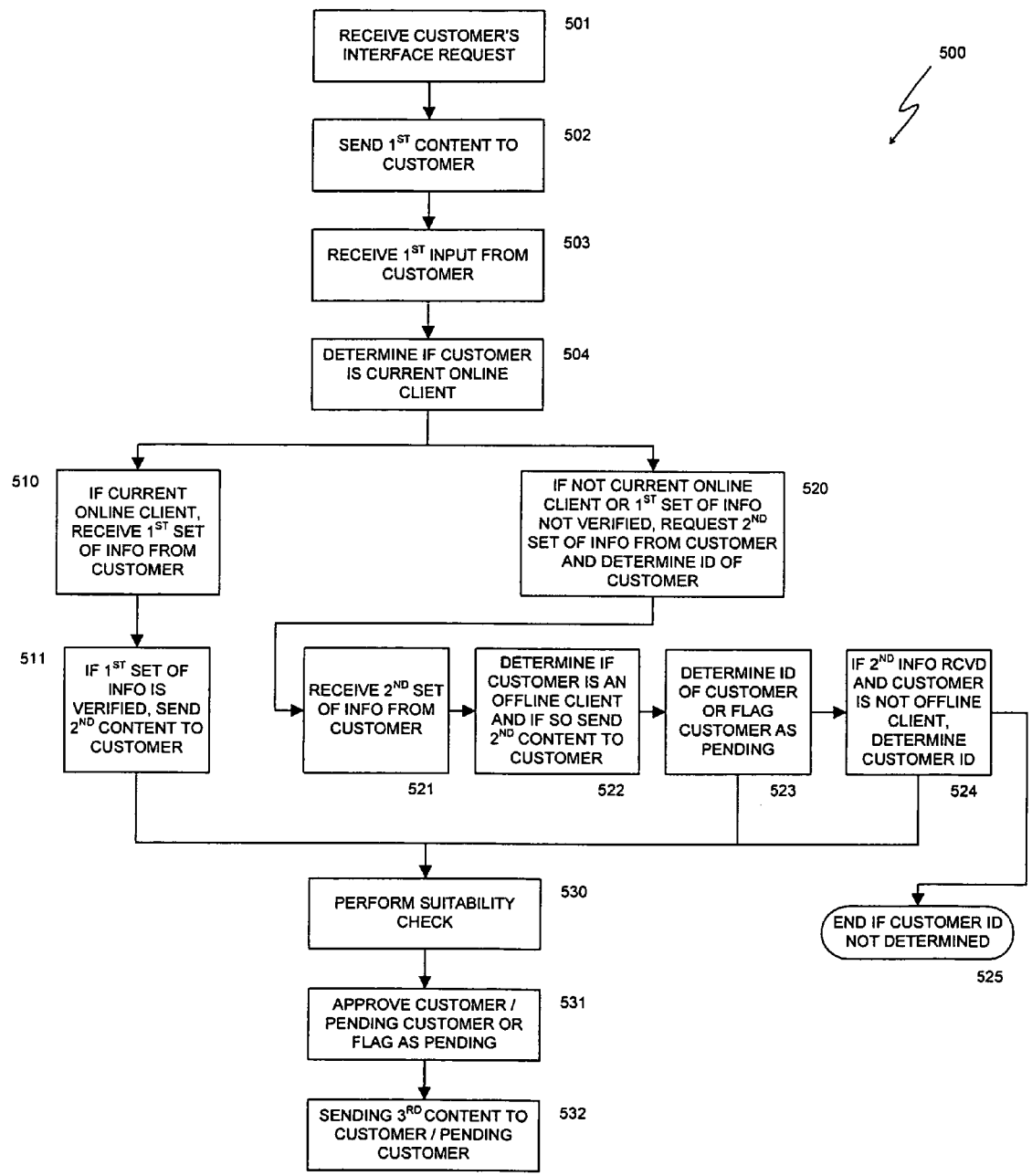
FIG. 5 is a flow diagram for a method of online account opening including contingency where customer is not an off-line client according to an embodiment of the disclosure.

With reference now directed to FIG. 5, a flow diagram 500 for a further method of online account opening including contingency where customer is not an off-line client according to an embodiment of the disclosure is presented. As between FIGS. 5 and 2, like reference numbers relate to like components and/or procedural steps. Accordingly, blocks 501, 502, 503, 504, 510, 511, 520, 521, 522, 523, 530, 531, and 532 are similar to blocks 201, 202, 203, 204, 210, 211, 220, 221, 222, 223, 230, 231, and 232 in FIG. 2 and the descriptions of those blocks will not be repeated.

At block 524, if the second set of information is received from the customer and a determination is made that the customer is not an offline client of the financial institution (as discussed above with respect to block 108 in FIG. 1A) terms and conditions may be sent to the customer as discussed above with respect to block 110 in FIG. 1A and an identity of the customer may be determined as discussed above with respect to block 118 in FIG. 1B. At block 525, if an identity of the customer cannot be determined, then the process may end. If the identity of the customer is determined, then the process may proceed with the suitability check at block 530 as discussed above with respect to block 115 in FIG. 1B.

Figure 6:
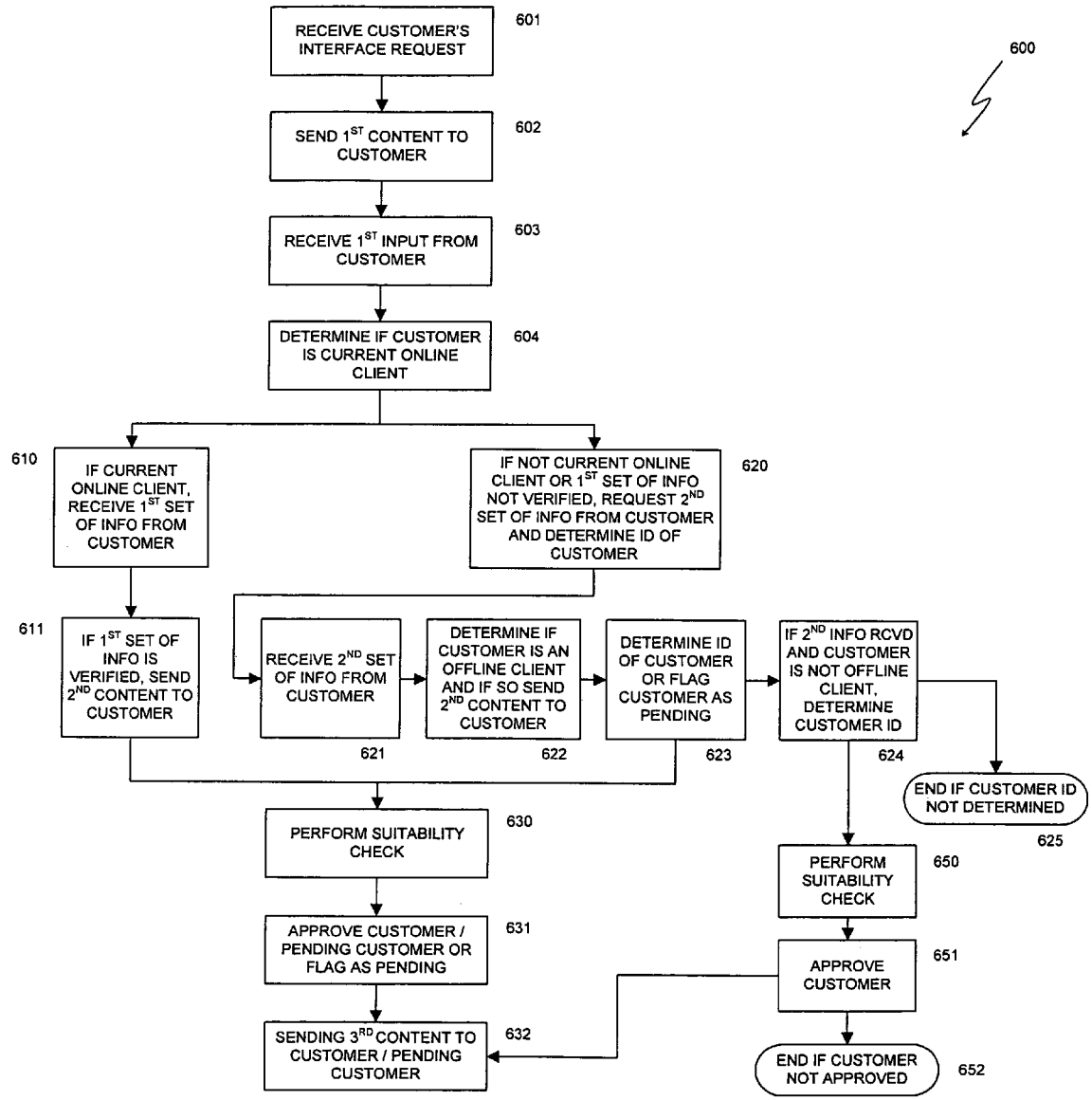
FIG. 6 is a flow diagram for a method of online account opening including further contingency where customer is not an off-line client according to an embodiment of the disclosure.

With reference now directed to FIG. 6, a flow diagram 600 for a further method of online account opening including further contingency where customer is not an off-line client according to an embodiment of the disclosure is presented. As between FIGS. 6 and 5, like reference numbers relate to like components and/or procedural steps. Accordingly, blocks 601, 602, 603, 604, 610, 611, 620, 621, 622, 623, 624, 625, 630, 631, and 632 are similar to blocks 501, 502, 503, 504, 510, 511, 520, 521, 522, 523, 524, 525, 530, 531, and 532 in FIG. 5 and the descriptions of those blocks will not be repeated.

At block 650, a suitability check may be performed on the customer as discussed above with respect to block 121 in FIG. 1B. At block 651, the customer may be approved as discussed above with respect to block 122 in FIG. 1B. If the customer is approved, then the process may continue with presentation of cross-sell products at block 632 as discussed at block 116 in FIG. 1B. At block 652, if the customer is not approved, the process may end as discussed above at block 123 in FIG. 1B.

Figure 7:
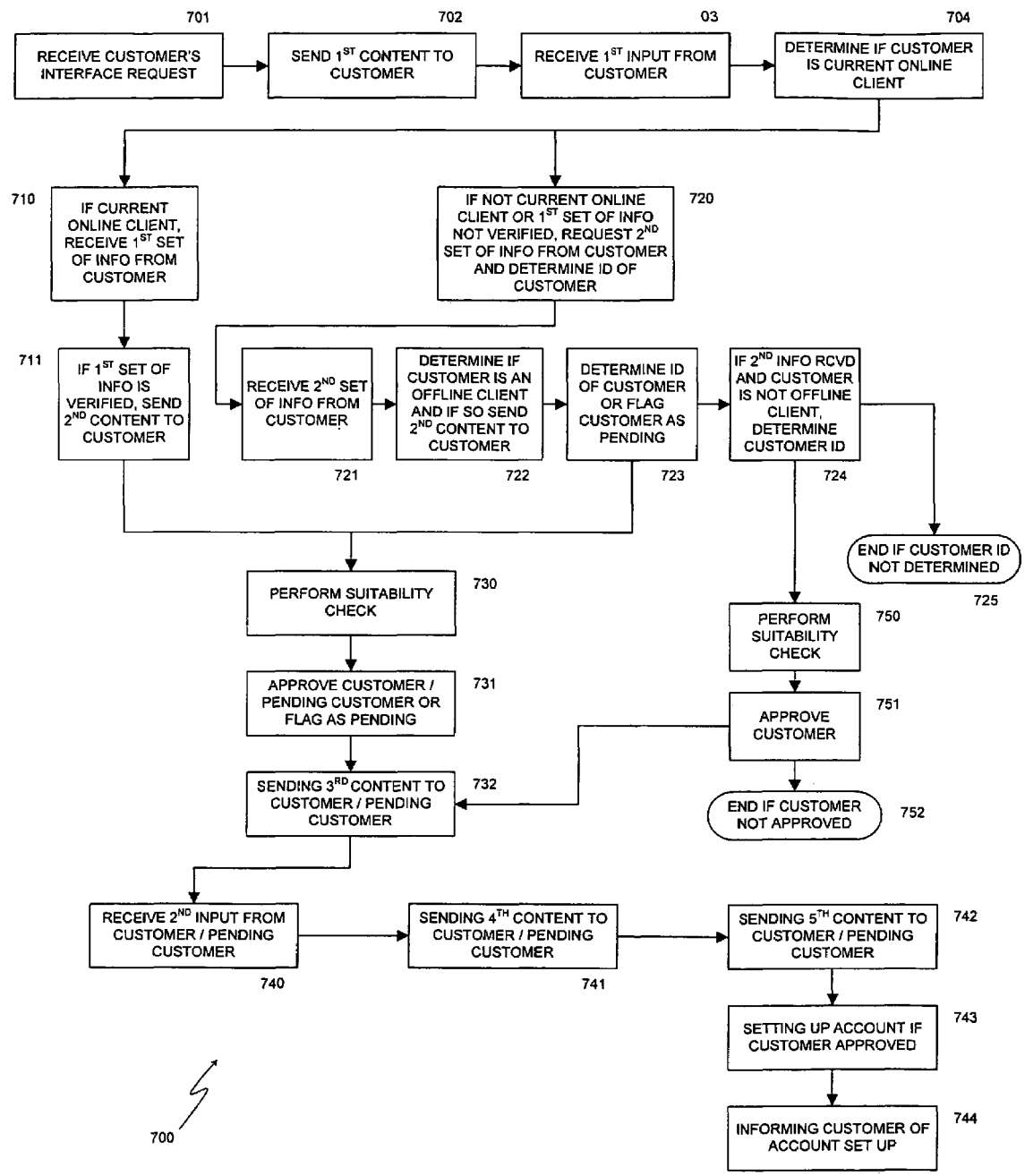
FIG. 7 is a flow diagram for a detailed method of online account opening according to an embodiment of the disclosure.

With reference now directed to FIG. 7, a flow diagram 700 for a detailed method of online account opening according to an embodiment of the disclosure is presented. As between FIGS. 7 and 6, like reference numbers relate to like components and/or procedural steps. Accordingly, blocks 701, 702, 703, 704, 710, 711, 720, 721, 722, 723, 724, 725, 730, 731, 732, 750, 751, and 752 are similar to blocks 601, 602, 603, 604, 610, 611, 620, 621, 622, 623, 624, 625, 630, 631, 632, 650, 651, and 652 in FIG. 6 and the descriptions of those blocks will not be repeated. Additionally, as between FIGS. 7 and 4, like reference numbers relate to like components and/or procedural steps. Accordingly, blocks 740, 741, 742, 743, and 744 are similar to blocks 440, 441, 442, 443, and 444 in FIG. 4 and the descriptions of those blocks will not be repeated.

With attention to FIG. 8, blocks 801 and 802 list some of the qualification criteria and priority criteria, respectively, that may be used for a method of online account opening according to an embodiment of the disclosure as discussed above with respect to block 124 in FIG. 1B. At block 801 the qualification criteria may include, but is not necessarily limited to, the following: the customer/pending customer's choice of one or more products, credit information for the customer/pending customer, whether the customer/pending customer is a new or existing offline client of the financial institution, a predetermined set of risk rules, a predetermined set of business rules, and a predetermined promotional code. At block 802 the priority criteria may include, but is not necessarily limited to, the following: goals of the financial institution, a factor based on an estimate of potential revenue for the financial institution for the customer's choice of a product, and a factor based on an analysis of a financial behavior, as is known in the art, of the customer or pending customer.

With reference now to FIGS. 9A through 9K, these Figures represent a detailed flow diagram for a method of online account opening according to an embodiment of the disclosure. FIGS. 9A through 9K are each divided into actions which may be performed wholly or predominantly at the financial institution (e.g., on a server associated with the financial institution which cause a different webpage to be displayed on the customer's computer terminal) and actions which may be performed wholly or predominantly at the customer's location (e.g., on a computer associated with the customer which displays the financial institution's webpage(s) and may submit information to the financial institution's server) as is known in the art.

Figure 9A:
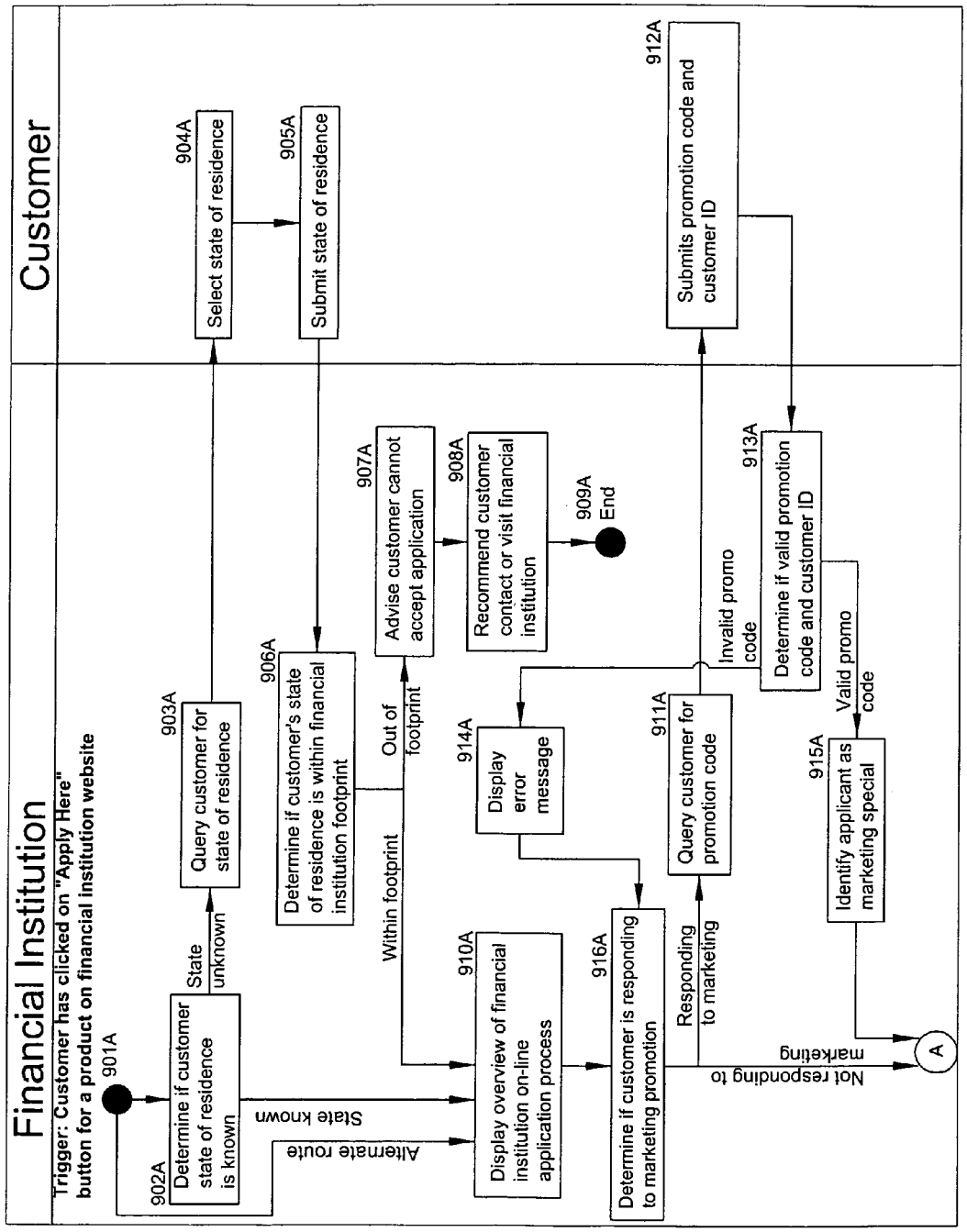

In FIG. 9A, at block 901A a customer may begin an online application transaction by, for example, clicking on an "Apply Here" button for a particular product on the website of a financial institution. At block 902A the financial institution may determine if the customer's state of residence is known. If the customer's state of residence is unknown, then at block 903A a query may be sent to the customer asking the customer to supply his/her state of residence. At block 904A, the customer may select his/her state of residence from a list presented to the customer (or by other methods known to those of skill in the art) and at block 905A the customer may submit his/her state of residence information to the financial institution. At block 906A the financial institution may receive the state of residence information from the customer and may determine if the customer's state of residence is in a state that the financial institution does, or is licensed to do, business (i.e., the financial institution's "footprint"). If the customer's state of residence is outside the financial institution's footprint then at block 907A the financial institution may advise the customer that the financial institution may not accept an application submitted by the customer and at block 908A the financial institution may recommend to the customer that he/she contact (e.g., by telephone, mail, etc.) or visit a branch of the financial institution for additional assistance. At block 909A the process ends.

If, from block 906A, the customer's state of residence is within the financial institution's footprint, or if, from block 902A, the customer's state of residence is known, then at block 910A the financial institution may send to the customer a webpage containing an overview of the financial institution's online application process.

Alternatively, in another embodiment, an alternate route (as shown in FIG. 9A) may be taken from the starting block 901A. This alternate route bypasses the determination of the customer's state of residence. In this embodiment, the customer's state of residence information may be obtained, for example, later in the process such as at block 907E in FIG. 9E. Furthermore, the list of products that may be presented to the customer for the customer to choose from, for example at block 906D in FIG. 9D, may be "generic" to every state, i.e., not "state specific". Once the customer's personal data, including state of residence, is obtained then the customer's state of residence may be used to determine product "terms", rates, pricing, etc., as well as for determining a list of cross-sell products to be presented to the customer.

At block 916A the financial institution may make a determination as to whether the customer initiated the online application process by responding to a marketing promotion. If the customer is responding to a marketing promotion, the financial institution may query the customer for a promotion code at block 911A. At block 912A the customer may receive the query and submit a response to the financial institution. The customer's response may include, but is not necessarily limited to, a promotion code and an identification code for the customer. At block 913A the financial institution may receive the customer's submission and may determine if the customer's promotion code and/or the customer's identification code are valid. If the promotion code and/or the customer identification code are invalid, the financial institution may send an error message to the customer at block 914A and may then loop back to block 916A. If the promotion code is valid, the financial institution may at block 915A identify the customer as "marketing special" for marketing, accounting, or other purposes.

Figure 9B:
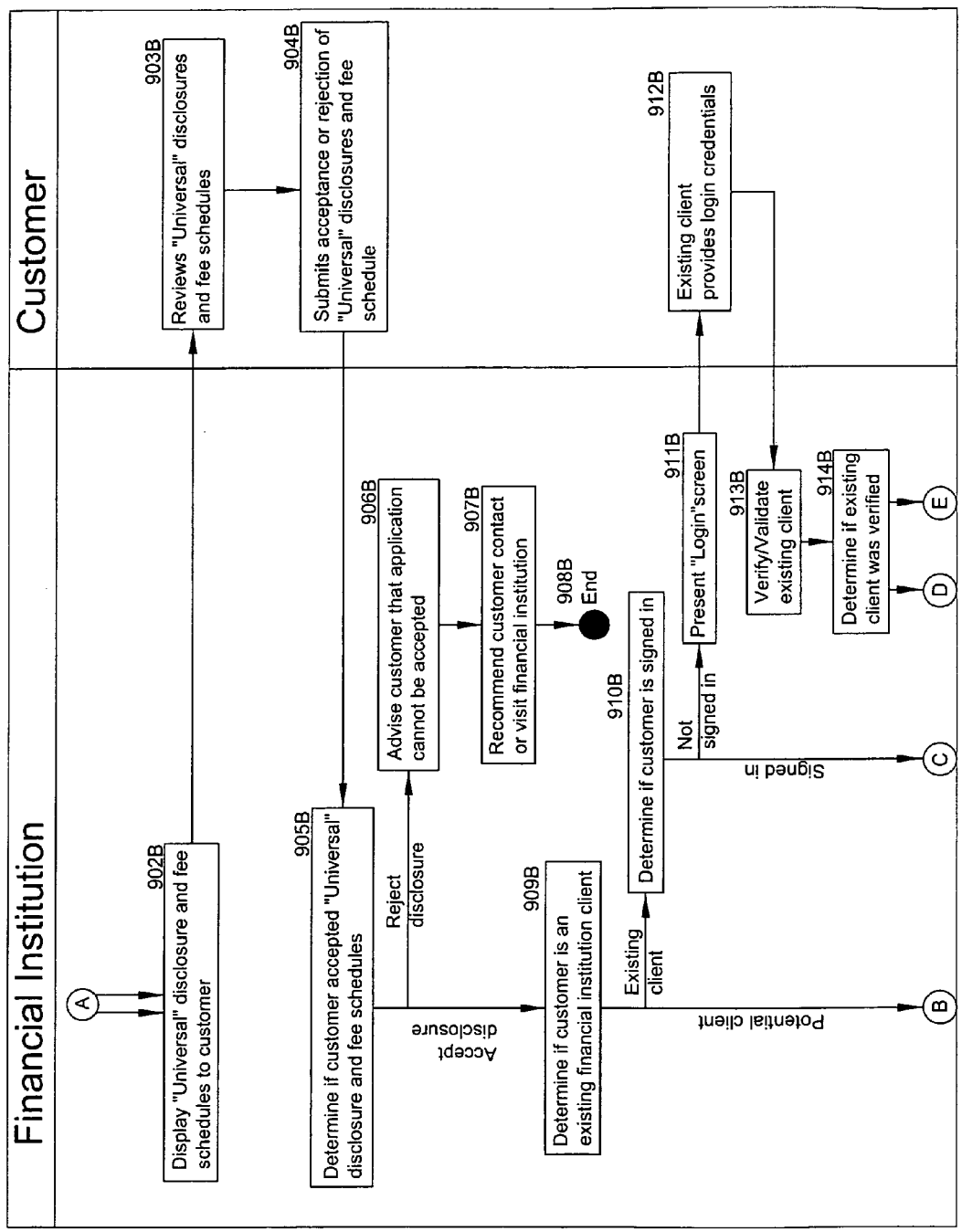

If, from block 915A the promotion code as valid, or if, from block 916A the customer is not responding to a marketing promotion then the process may continue in FIG. 9B via connecting block A.

With attention now drawn to FIG. 9B, from FIG. 9A via connecting block A the financial institution may at block 902B display disclosure and fee schedules to the customer. The disclosures and fee schedules may be "universal" for all products offered by the financial institution on the financial institution's website or, in an embodiment, the disclosures and fee schedules may be tailored to the specific product chosen by the customer at block 901A. At block 903B the customer may review the "universal" disclosures and fee schedules and at block 904B submit to the financial institution an acceptance or rejection of the "universal" disclosures and fee schedules. At block 905B the financial institution may determine if the customer accepted or rejected the "universal" disclosures and fee schedules. If the disclosures/fee schedules were rejected, then at block 906B the financial institution may advise the customer that the customer's application cannot be accepted and at block 907B the financial institution may recommend to the customer that he/she contact (e.g., by telephone, mail, etc.) or visit a branch of the financial institution for additional assistance. At block 908B the process ends.

If at block 905B the disclosures/fee schedules were accepted, then at block 909B a determination may be made by the financial institution as to whether the customer is an existing client of the financial institution. If the customer is an existing client of the financial institution, then at block 910B the financial institution may determine if the customer is signed in to the financial institution's system. If the customer is not signed in, then at block 911B the financial institution may send a login screen to the customer. Upon receipt of the login screen, the customer (who is an existing client), at block 912B, may provide his/her login credentials to the financial institution. At block 913B the financial institution may receive the customer's login credentials and may verify/validate that the customer is an existing client of the financial institution. At block 914B the financial institution may determine if the customer/existing client was verified.

Figure 9C:
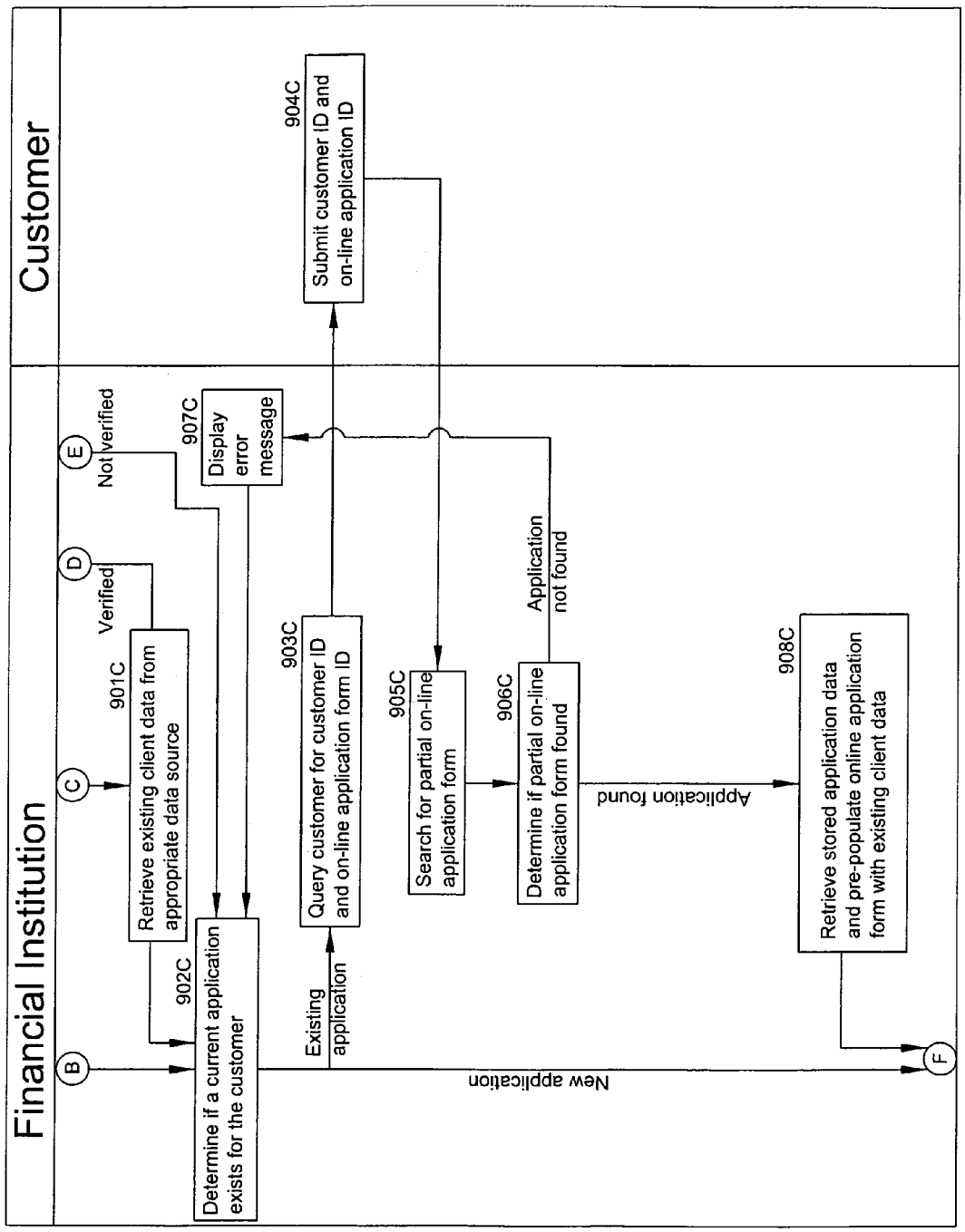

If, from block 910B the customer is determined to not be signed in, or if from block 914B it was determined that the customer/existing client was verified, then the process may continue at block 901C in FIG. 9C via connecting blocks C and D, respectively. At block 901C the financial institution may retrieve existing client data for the customer from appropriate an data source and the process may continue at block 902C.

If, from block 909B the customer is determined to not be an existing client of the financial institution, or if, from block 914B it was determined that the customer/existing client was not verified, then the process may continue at block 902C in FIG. 9C via connecting blocks B and E, respectively.

With attention now directed to FIG. 9C, specifically to block 902C, a determination may be made at the financial institution as to whether a current application for the customer exists. The financial institution may query the customer at block 903C for a customer identification code and/or an online application identification code. At block 904C the customer may submit to the financial institution a customer identification code and/or an online application identification code. At block 905C the financial institution may receive the information codes from the customer and may search for a partially-completed online application form. At block 906C the financial institution may determine if a partially-completed online application form was found. If a partially-completed online application form was not found, then the financial institution may display to the customer an error message at block 907C and the process may loop back to block 902C. If a partially-complete online application form was found, then at block 908C the financial institution may retrieve the data for the partially-completed online application form and use that data to pre-populate a current online application form. Alternatively, the financial institution may retrieve the partially-completed online application form and display that form to the customer.

Figure 9D:
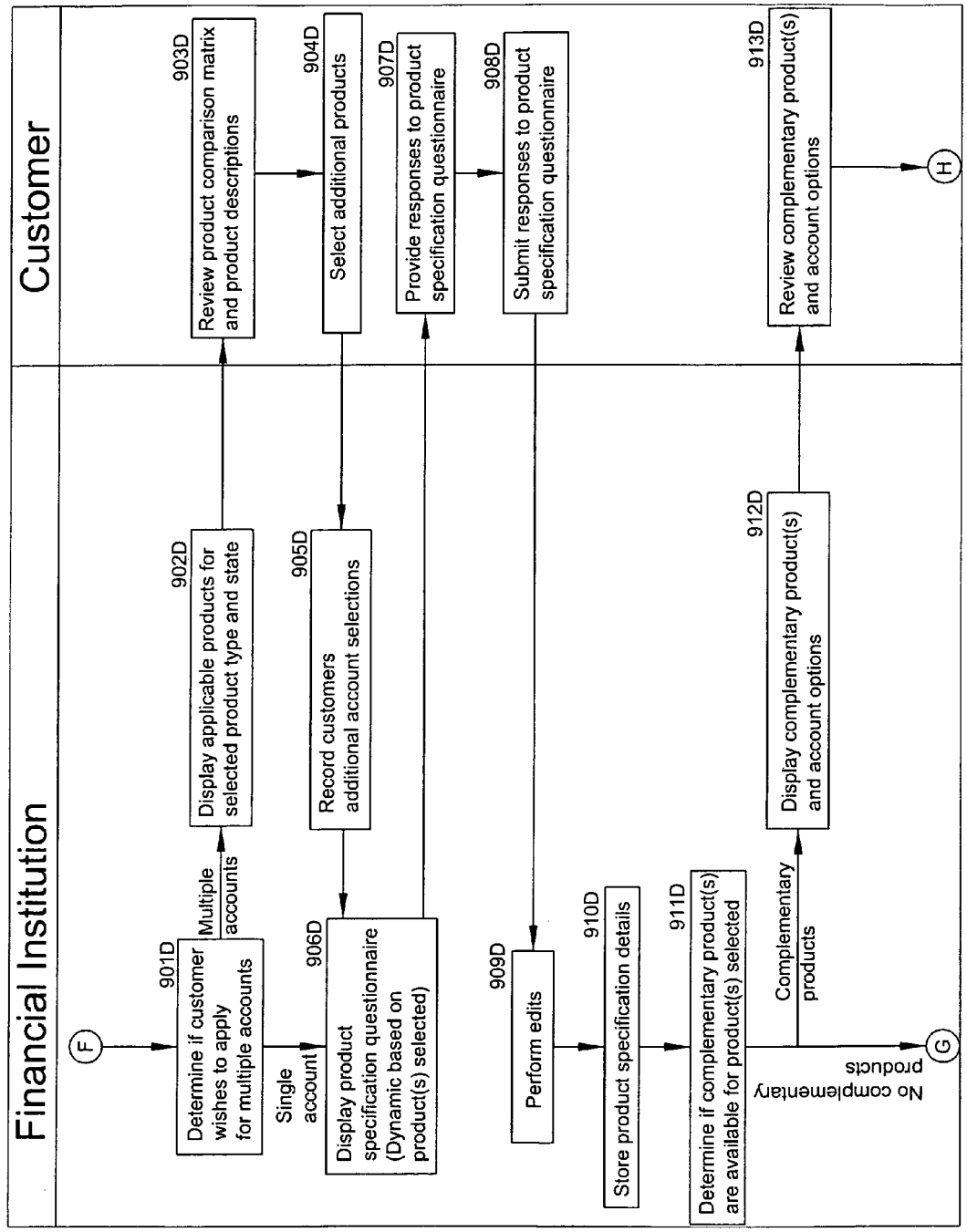

If, from block 902C the customer is determined to not have an existing application, or if, from block 908C the partially-completed online application and/or data has been retrieved, then the process may continue at block 901D in FIG. 9D via connecting block F.

With attention now to FIG. 9D, at block 901D the financial institution may determine (from appropriate customer input) if the customer wishes to apply for multiple accounts. If so, the financial institution may display, at block 902D, on the customer's computer screen a list of applicable products from which the customer may choose. The products listed in the list of applicable products may be selected by the financial institution based on at least the initial product chosen by the customer in block 901A and/or the state of residence of the customer as selected in block 904A. Additionally, the list of applicable products may be based on a promotion code or a determination that the customer is responding to an advertisement. The list of applicable products may be displayed, for example, on the customer's computer screen in a matrix form for easy comparison by the customer. The information displayed in the matrix may include the name of the product(s) and a brief description of the product(s). At block 903D the customer may review the product matrix and, at block 904D, the customer may select an additional product or products. At block 905D the financial institution may receive the customer's additional selections and record those selections.

If, at block 901D, the customer decides to continue with the process for a single account/product, or if, from block 905D the financial institution has recorded the customer's additional account selection(s), then at block 906D the financial institution may display on the customer's computer screen a product(s) specification questionnaire. In an embodiment, this questionnaire may be dynamically presented based on the product(s) selected by the customer. At block 907D the customer may review the questionnaire and provide responses to the questionnaire. At block 908D the customer may submit his/her responses to the questionnaire to the financial institution. At block 909D the financial institution may perform edits on the questionnaire responses submitted by the customer. At block 910D the financial institution may store details regarding the product specifications. At block 911D the financial institution may determine if complementary product(s) are available for the product(s) selected by the customer. If there are complementary products available, then at block 912D the financial institution may display on the customer's computer screen the complementary products and account options. At block 913D the customer may review the complementary products and account options. The process may continue at block 901E in FIG. 9E via connecting block H.

Figure 9E:
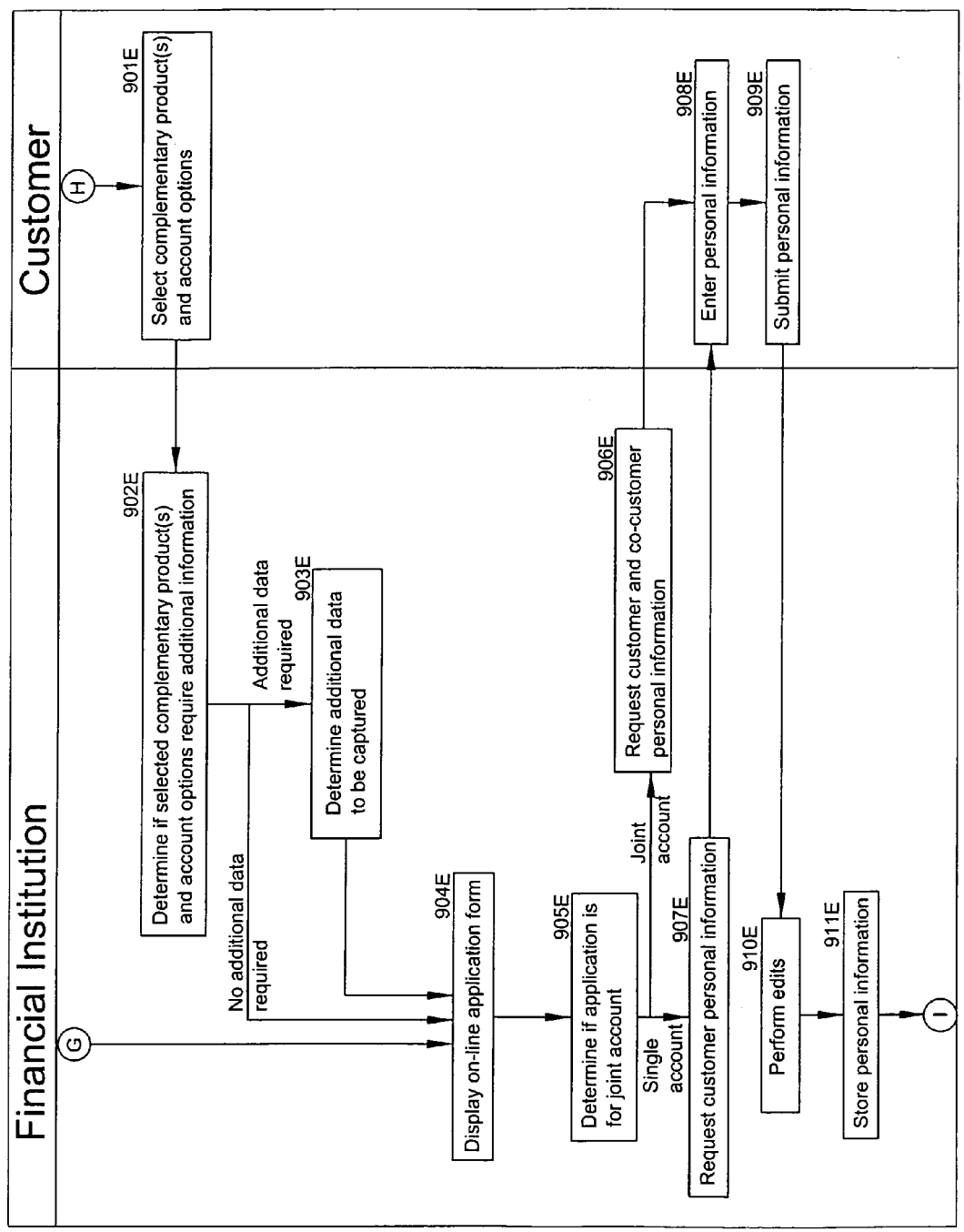

With attention now drawn to FIG. 9E, from FIG. 9D via connecting block H the customer may at block 901E select complementary product(s) and account options and transmit those selections to the financial institution. At block 902E the financial institution may determine if the customer's selected complementary product(s) and account options require additional information from the customer. If additional information is required, at block 903E the financial institution may determine what additional information needs to be captured.

If, from block 911D the financial institution determines that there are no complementary products then the process may continue in FIG. 9E via connecting block G.

At block 904E, if there are no complementary products from block 911D, or if there is no additional information required from block 902E, or after there has been a determination as to what additional information needs to be captured at block 903E, then the financial institution may display on the customer's computer screen an online application form. At block 905E the financial institution may determine if the application is for a joint account (based on input from the customer). If the application is for a joint account, at block 906E the financial institution may request customer and co-customer personal information. If the application is for a single account, at block 907E the financial institution may request customer personal information. At block 908E the customer(s) may enter his/her/their personal information and at block 909E the personal information may be submitted to the financial institution. At block 910E the financial institution may receive the customer's personal information and perform edits as necessary. At block 911E the financial institution may store the customer's personal information. The process may continue at block 901F in FIG. 9F via connecting block I.

Figure 9F:
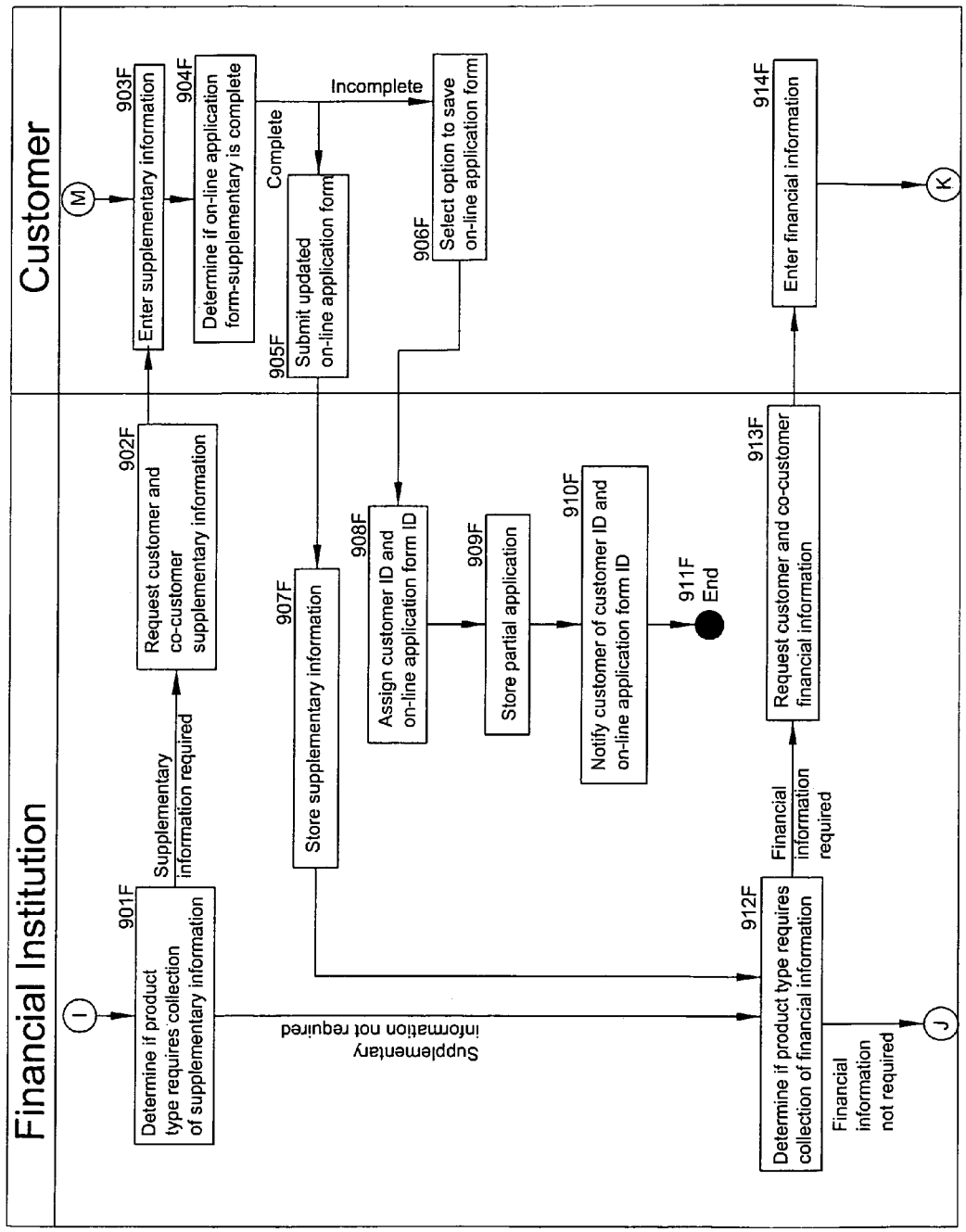

With reference now at FIG. 9F, at block 901F the financial institution may determine if the type of product(s) selected by the customer requires the collection of supplementary information. If supplementary information is determined to be required, at block 902F the financial institution may request customer and co-customer supplementary information. At block 903F the customer and/or co-customer may enter supplementary information in the online application and at block 904F the customer and/or co-customer may determine if the online application form is complete. Also block 903F may be a loop-back via connecting block M as discussed below with respect to block 912G in FIG. 9G. If the customer determines that the online application form is incomplete, the customer may, at block 906F select to save the incomplete online application form. At block 908F the financial institution may receive the customer's selection and assign a customer identification code and/or an online application code, at block 909F the financial institution may store the customer's partial application, and at block 910F the financial institution may notify the customer of the customer identification code and/or the online application identification code. The process may then stop at block 911F.

If, at block 904F, the customer and/or co-customer determines that the online application form is complete, then at block 905F the customer may submit the online application form to the financial institution. At block 907F the financial institution may receive the online application form from the customer and store the entire application or just the supplementary information.

At block 912F, if at block 901F the financial institution determines that the type of product(s) selected by the customer do not require the collection of supplementary information, or from block 907F the financial institution stores the customer's application or supplementary information, the financial institution may determine if the customer's selected product type(s) require the collection of financial information. If the financial institution determines that financial information is required, at block 913F the financial institution may request customer and/or co-customer financial information from the customer and/or co-customer. At block 194F the customer and/or co-customer may enter financial information. The process may continue at block 901G in FIG. 9G via connecting block K. If, at block 912F, the financial institution determines that financial information is not required, the process may continue at block 909G in FIG. 9G via connecting block J.

Figure 9G:
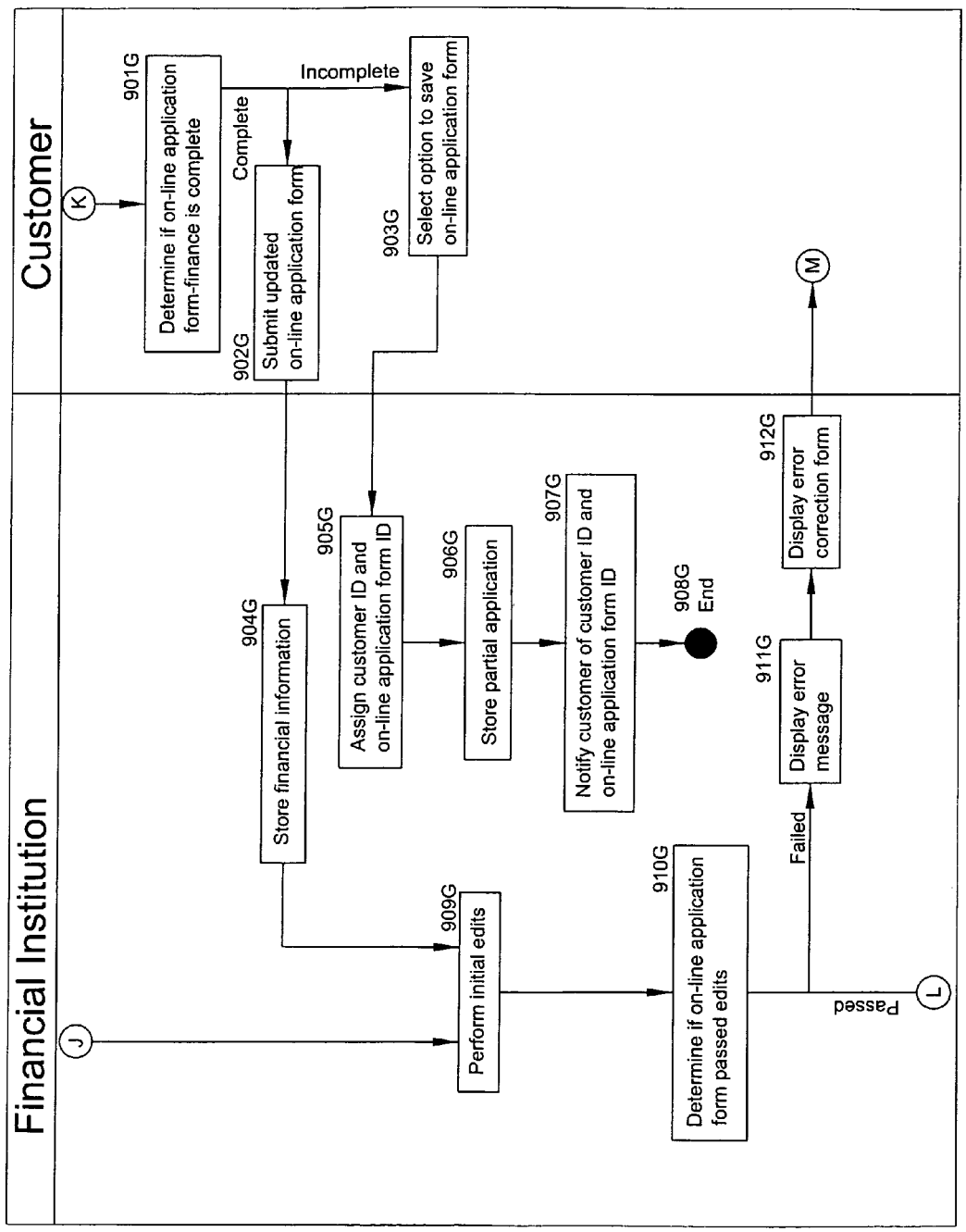

With attention now directed towards FIG. 9G, at block 901G the customer may determine if the online application form is complete. If the customer and/or co-customer determines that the online application form is incomplete, the customer and/or co-customer may, at block 903G select to save the incomplete online application form. At block 905G the financial institution may receive the customer's and/or co-customer's selection and assign a customer identification code and/or an online application code, at block 906G the financial institution may store the customer's and/or co-customer's partial application, and at block 907G the financial institution may notify the customer and/or co-customer of the customer identification code and/or the online application identification code. The process may then stop at block 908G.

If, at block 901G, the customer and/or co-customer determines that the online application form is complete, then at block 902G the customer and/or co-customer may submit the online application form to the financial institution. At block 904G the financial institution may receive the online application form from the customer and store the entire application or just the financial information.

At block 909G, either continuing from block 912F via connecting block J, or after block 904G, the financial institution may perform edits on the online application. At block 910G a determination may be made as to whether the online application has passed the edits. If it is determined by the financial institution that the online application has failed the edits, at block 911G the financial institution may display an error message on the customer's computer screen, at block 912G the financial institution may display an error correction form on the customer's computer screen and the process may loop back via connecting block M to block 903F in FIG. 9F. If at block 910G the financial institution determines that the online application has passed the edits, the process may continue at block 901H in FIG. 9H via connecting block L.

Figure 9H:
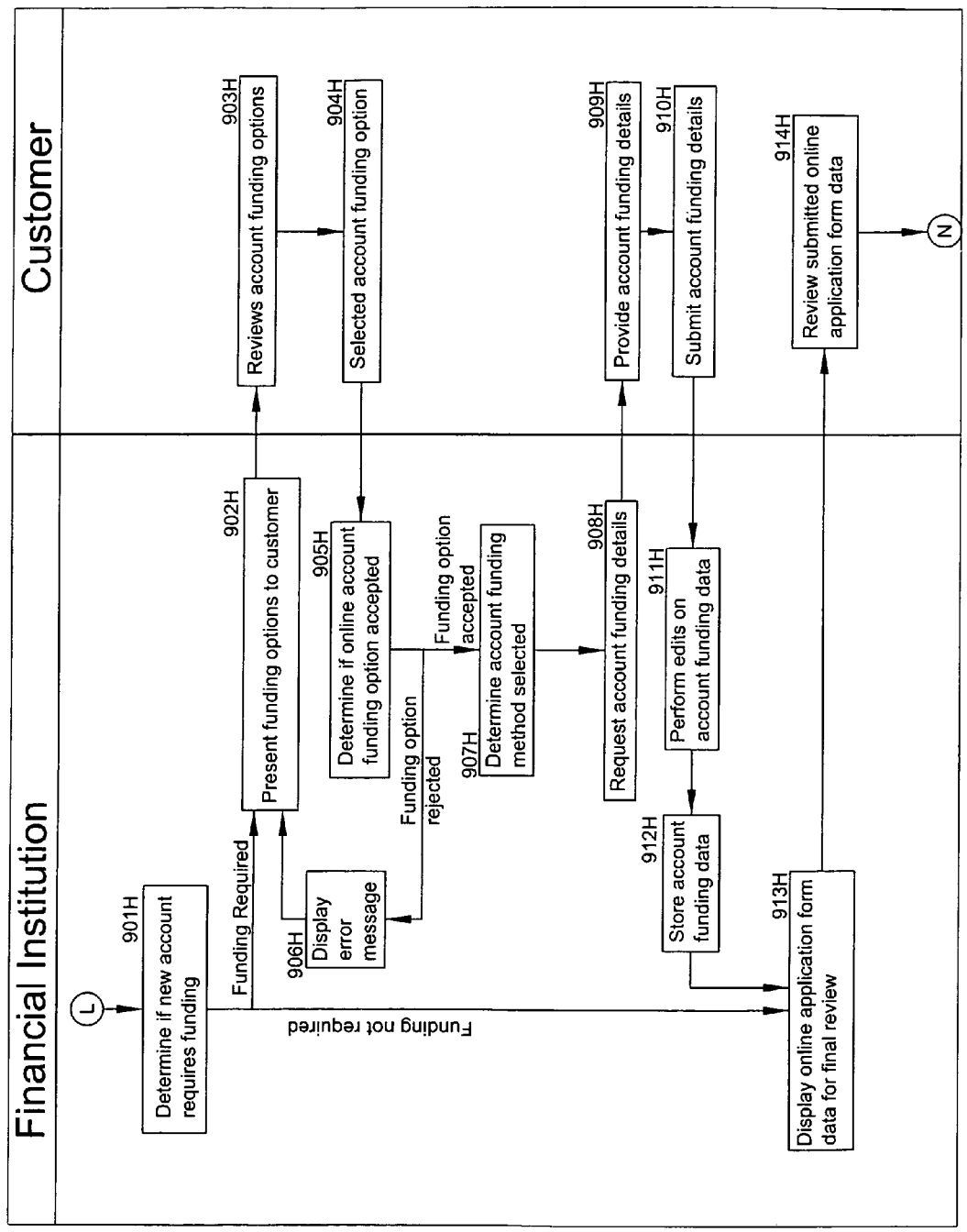

With attention now at FIG. 9H, at block 901H the financial institution may determine if the new account(s) selected by the customer requires funding. If the financial institution determines that funding is required, at block 902H the financial institution may present funding options to the customer. At block 903H the customer may review the account funding options and at block 904H the customer may select account funding option(s). At block 905H the financial institution may receive the customer's account funding option selection(s) and may determine if the selected online account funding option is acceptable. If the financial institution rejects the customer's selected funding option, at block 906H the financial institution displays an error message on the customer's computer screen and loops the process back to block 902H. If the financial institution accepts the customer's selected funding option, at block 907H the financial institution determines the account funding method selected by the customer and at block 908H the financial institution requests account funding details from the customer. At block 909H the customer receives the account funding details request from the financial institution and provides account funding details. At block 910H the customer submits the account funding details to the financial institution. At block 911H the financial institution receives the account funding details from the customer and performs edits on the account funding data. At block 912H the financial institution stores the customer's account funding data.

At block 913H, if the financial institution determines in block 901H that new account funding is not required, or the financial institution stored account funding data at block 912H, the financial institution displays on the customer's computer screen the online application form data for final review. At block 914H the customer receives and reviews the online application form data. The process continues at block 901I in FIG. 9I via connecting block N.

Figure 9I:
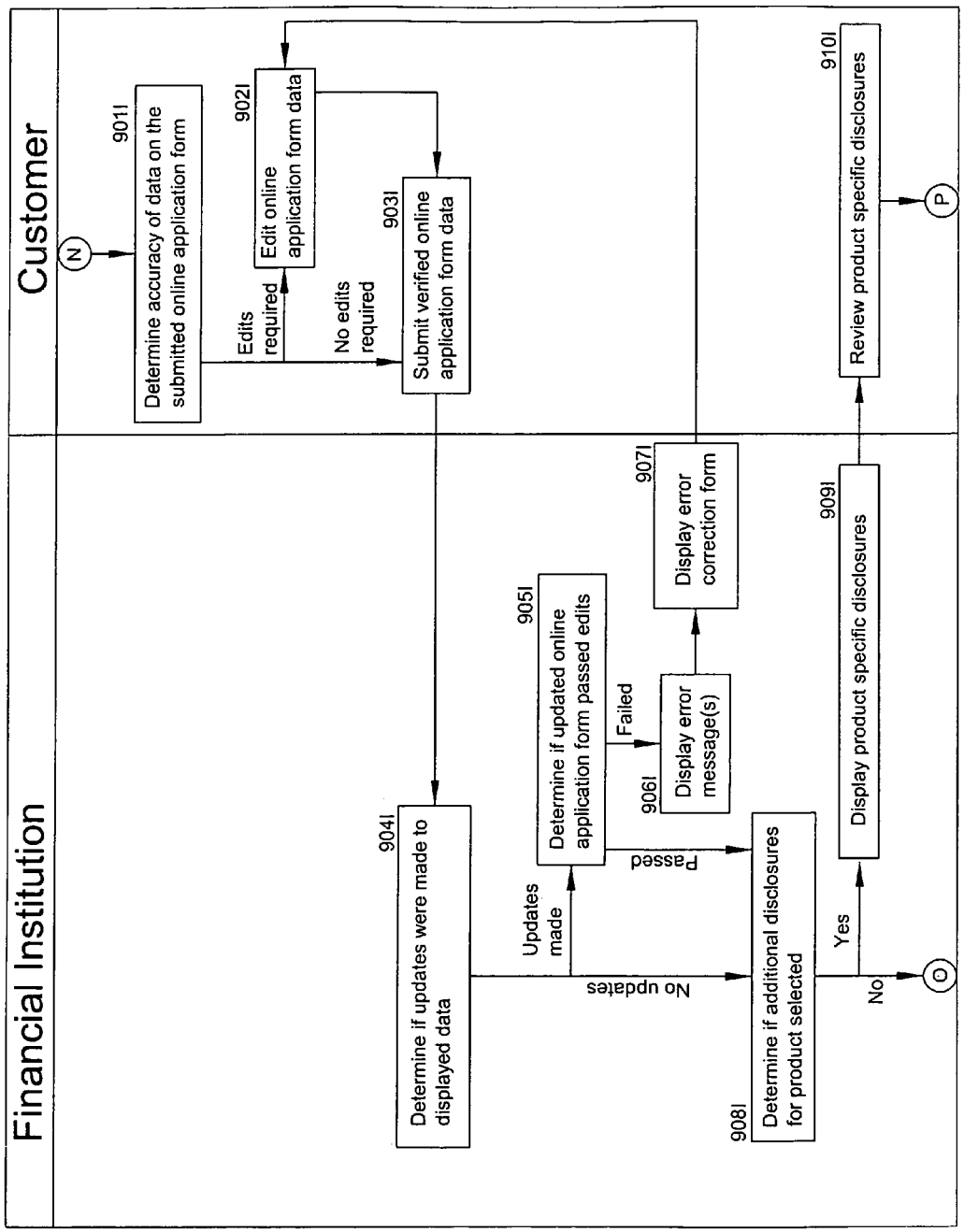

With reference now to FIG. 9I, at block 901I the customer determines the accuracy of the data on the submitted online application form. If the customer determines that edits are required, at block 902I the customer edits the online application form data. After the customer edits the online application form data or if no edits are required, at block 903I the customer submits the verified/edited online application form data to the financial institution. At block 904I, the financial institution receives the verified/edited online application form data and determines if updates were made to the data. If updates were made to the data, at block 905I the financial institution may determine if the updated online application form passed the financial institution edit checks. If the updated online application form failed the edit check, at block 906I the financial institution may display an error message on the customer's computer screen, at block 907I the financial institution may display an error correction form on the customer's computer screen, and the process loops back to block 902I.

At block 908I, if the financial institution determines that no updates were made, or if at block 905I the financial institution determines that the updated online application form passed the edit checks, the financial institution may determine if additional disclosures are required for the product(s) selected by the customer. If additional disclosures are required, at block 909I the financial institution displays the product(s)

specific disclosures on the customer's computer screen. At block 910I the customer receives and reviews the product(s) specific disclosures. The process continues at block 901J in FIG. 9J via connecting block P.

If the financial institution determines at block 908I that additional disclosures are not required, then the process continues at block 901K in FIG. 9K via connecting blocks O and Q.

Figure 9J:
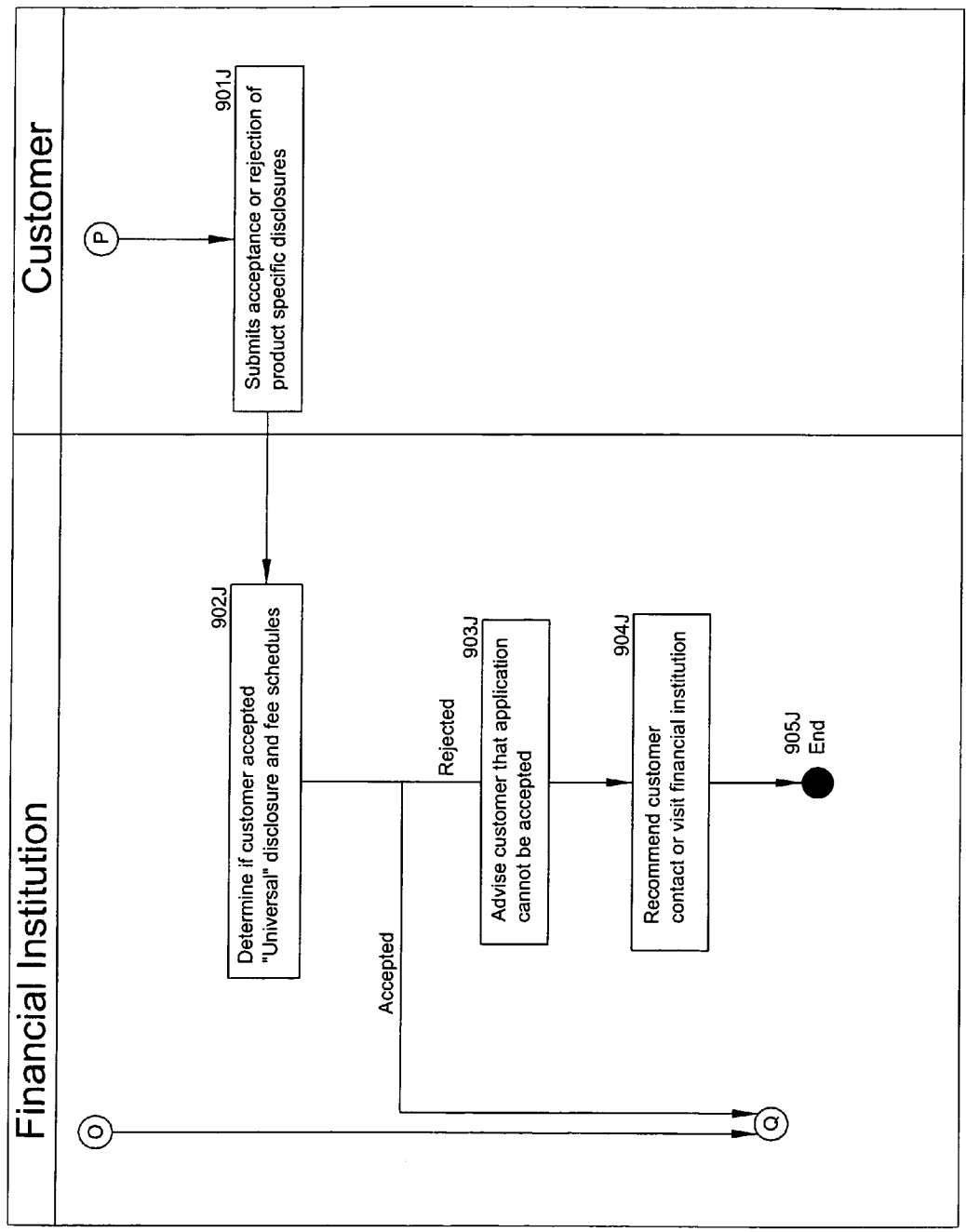

Now considering FIG. 9J, at block 901J, after receiving and reviewing the product(s) specific disclosures at block 910I in FIG. 9I, the customer may submit an acceptance or rejection of the product(s) specific disclosures. At block 902J the financial institution receives the acceptance or rejection of the product(s) specific disclosures from the customer and may determine if the customer accepted or rejected the "universal" disclosure and fee schedules described above with respect to blocks 902B, 903B, 904B, and 905B in FIG. 9B. If the financial institution determines that the customer rejected the product(s) specific disclosures, at block 903J the financial institution may advise the customer that the customer's application cannot be accepted and at block 904J the financial institution may recommend to that the customer that he/she contact (e.g., by telephone, mail, etc.) or visit a branch of the financial institution for additional assistance. At block 905J the process ends.

If, at block 902J the financial institution determines that the customer accepted the "universal" disclosure and fee schedules and the product(s) specific disclosures, the process continues at block 901K in FIG. 9K via connecting block Q.

With attention now directed to FIG. 9K, at block 901K if the financial institution determined at block 908I in FIG. 9I that no additional disclosures for the selected product(s) are required, or at block 902J if the financial institution determined that the customer accepted the "universal" disclosure and fee schedules and the product(s) specific disclosures, the financial institution may determine if application fees are due from the customer. If application fees are due from the customer, at block 902K the financial institution may display on the customer's computer screen an application fee collection form. At block 903K the customer may receive and complete the application fee collection form and at block 904K the customer may submit the application fee collection form to the financial institution. At block 905K the financial institution may receive the completed application fee collection form and perform edits on the form. At block 906K the financial institution may store application fee data.

At block 907K, if the financial institution at block 901K determined that no application fees are required, or if the financial institution at block 906K stores the customer's application fee data, the financial institution may display on the customer's computer screen a verification of receipt of the completed online application form. At block 908K the process ends.

While preferred embodiments of the present disclosure have been described, it is to be understood that the embodiments described are illustrative only and that the scope of the invention is to be defined solely by the appended claims when accorded a full range of equivalents, many variations and modifications naturally occurring to those of skill in the art from a perusal hereof.

We claim:

1. A method for interfacing with a financial institution using a computer interface, the method comprising the steps of:

(a) receiving a customer's interface request at the financial institution;

(b) sending a first content to the customer wherein said first content is presented to the customer and wherein said first content includes a list comprising one or more products;

(c) receiving at the financial institution a first input from the customer wherein said first input is based at least on said first content and includes a choice of one or more of said products;

(d) determining if the customer is a current online client of the financial institution;

(e) if the customer is a current online client, receiving from the customer a first set of information and if said first set of information is verified by the financial institution, sending a second content to the customer;

(f) if the customer is not a current online client or if said first set of information is not verified by the financial institution, requesting a second set of information from the customer and determining a status of the customer, comprising:

(i) receiving at the financial institution the second set of information from the customer;

(ii) determining if the customer is an offline client of the financial institution based at least on the second set of information and if the customer is an offline client, sending the second content to the customer; and (iii) determining an identification of the customer if the second information has been received and the customer has been determined to be an offline client, or flagging the customer as a pending customer if an identification of the customer cannot be determined;

(g) performing a suitability check on the customer or pending customer based on at least the first input;

(h) approving the customer or pending customer for the chosen product based at least on the suitability check or flagging the customer as a pending customer if not approved for the chosen product based at least on the suitability check; and (i) sending a third content to the customer or pending customer based at least on a set of qualification criteria wherein said third content includes a list comprising one or more cross-sell products.

2. The method of claim 1 further comprising the steps of:

(j) receiving at the financial institution a second input from the customer or pending customer wherein said second input is based on at least said third content and includes a choice of one or more of said cross-sell products;

(k) sending a fourth content to the customer or pending customer; and (l) sending a fifth content to the customer or pending customer.

3. The method of claim 2 further comprising the steps of:

(m) setting up an account for the customer if the customer has been approved for the chosen product; and (n) informing the customer of the account set up.

4. The method of claim 1 wherein step (f) further comprises:

(iv) if the second information has been received and the customer has been determined to not be an offline client, determining an identification of the customer and ending the interface session if an identification of the customer cannot be determined.

5. The method of claim 4 wherein step (f)(iv) further comprises performing a suitability check on the customer based at least on the first input and the second information, and approving the customer for the chosen product based at least on the suitability check or ending the interface session if the customer is not approved.

6. The method of claim 1 wherein said interface request is path dependent.

7. The method of claim 6 wherein the one or more products on said list comprising one or more products are chosen based on said path.

8. The method of claim 6 wherein said products are selected from the group consisting of: credit card, checking account, savings account, loan, insurance, investment, cash management, and check card.

9. The method of claim 1 wherein said second content is based at least on said first or second set of information and said choice of one or more products.

10. The method of claim 1 wherein said suitability check includes information selected from the group consisting of: credit check information, debit check information, fraud database information, identity verification information, account abuse information, financial history information, and combinations thereof.

11. The method of claim 1 wherein said set of qualification criteria includes criteria selected from the group consisting of: said choice of one or more products, said suitability check, a predetermined set of risk rules, a predetermined set of business rules, a predetermined promotional code, said first or second set of information, existing customer or pending customer accounts at said financial institution, existing customer or pending customer products at said financial institution, and combinations thereof.

12. The method of claim 11 wherein said predetermined set of risk rules includes a factor based on a current line of credit request.

13. The method of claim 11 wherein said predetermined set of business rules includes a factor based on an estimate of potential revenue for said financial institution for said choice of one or more products.

14. The method of claim 13 wherein said predetermined set of business rules further includes a factor based on an analysis of a financial behavior of said customer or pending customer.

15. The method of claim 2 wherein said fourth content is based at least on said first or second set of information, said choice of one or more products, and said choice of one or more cross-sell products.

16. The method of claim 2 wherein said fifth content is based at least on said first or second set of information, said choice of one or more products, and said choice of one or more cross-sell products.

17. The method of claim 5 wherein said suitability check includes information selected from the group consisting of: credit check information, debit check information, fraud database information, identity verification information, account abuse information, financial history information, and combinations thereof.

18. A method for interfacing with a financial institution using a computer interface, the method comprising the steps of:
    (a) receiving a customer's interface request at the financial institution;
    (b) sending a first content to the customer wherein said first content is presented to the customer and wherein said first content includes a list comprising one or more products;
    (c) receiving at the financial institution a first input from the customer wherein said first input is based at least on said first content and includes a choice of one or more of said products;
    (d) determining if the customer is a current online client of the financial institution;
    (e) if the customer is a current online client, receiving from the customer a first set of information and if said first set of information is verified by the financial institution, sending a second content to the customer;
    (f) if the customer is not a current online client or if said first set of information is not verified by the financial institution, requesting a second set of information from the customer and determining a status of the customer, comprising:
        (i) receiving at the financial institution the second set of information from the customer;
        (ii) determining if the customer is an offline client of the financial institution based at least on the second set of information and if the customer is an offline client, sending the second content to the customer;
        (iii) if the second information has been received and the customer has been determined to be an offline client, determining an identification of the customer or flagging the customer as a pending customer if an identification of the customer cannot be determined; and
        (iv) if the second information has been received and the customer has been determined to not be an offline client:
            (A) determining an identification of the customer or ending the interface session if an identification of the customer cannot be determined;
            (B) performing a suitability check on the customer based at least on the first input and the second information; and
            (C) approving the customer for the chosen product based at least on the suitability check or ending the interface session if the customer is not approved;
    (g) performing a suitability check on the customer or pending customer based on at least the first input;
    (h) approving the customer or pending customer for the chosen product based at least on the suitability check or flagging the customer as a pending customer if not approved for the chosen product based at least on the suitability check;
    (i) sending a third content to the customer or pending customer based at least on a set of qualification criteria wherein said third content includes a list comprising one or more cross-sell products;
    (j) receiving at the financial institution a second input from the customer or pending customer wherein said second input is based on at least said third content and includes a choice of one or more of said cross-sell products;
    (k) sending a fourth content to the customer or pending customer;
    (l) sending a fifth content to the customer or pending customer;
    (m) setting up an account for the customer if the customer has been approved for the chosen product; and
    (n) informing the customer of the account set up.

19. The method of claim 18 wherein said interface request is path dependent.

20. The method of claim 19 wherein the one or more products on said list comprising one or more products are chosen based on said path.

21. The method of claim 19 wherein said products are selected from the group consisting of: credit card, checking account, savings account, loan, insurance, investment, cash management, and check card.

22. The method of claim 18 wherein said second content is based at least on said first or second set of information and said choice of one or more products.

23. The method of claim 18 wherein said suitability check includes information selected from the group consisting of: credit check information, debit check information, fraud database information, identity verification information, account abuse information, financial history information, and combinations thereof.

24. The method of claim 18 wherein said set of qualification criteria includes criteria selected from the group consisting of: said choice of one or more products, said suitability check, a predetermined set of risk rules, a predetermined set of business rules, a predetermined promotional code, said first or second set of information, existing customer or pending customer accounts at said financial institution, existing customer or pending customer products at said financial institution, and combinations thereof.

25. The method of claim 24 wherein said predetermined set of risk rules includes a factor based on a current line of credit request.

26. The method of claim 24 wherein said predetermined set of business rules includes a factor based on an estimate of potential revenue for said financial institution for said choice of one or more products.

27. The method of claim 26 wherein said predetermined set of business rules further includes a factor based on an analysis of a financial behavior of said customer or pending customer.

28. The method of claim 18 wherein said fourth content is based at least on said first or second set of information, said choice of one or more products, and said choice of one or more cross-sell products.

29. The method of claim 18 wherein said fifth content is based at least on said first or second set of information, said choice of one or more products, and said choice of one or more cross-sell products.

* * * * *